United States Patent
Matsuoka et al.

(10) Patent No.: US 6,615,109 B1
(45) Date of Patent: Sep. 2, 2003

(54) SYSTEM AND METHOD FOR GENERATING AN ACTION OF AN AUTOMATIC APPARATUS

(75) Inventors: Tsunetaro Matsuoka, Tokyo (JP); Tadashi Otsuki, Kanagawa (JP); Tetsuya Konishi, Tokyo (JP); Tomoaki Kasuga, Chiba (JP); Kunio Takemoto, Tokyo (JP); Ayako Okita, Tokyo (JP); Yaeko Fujita, Tokyo (JP); Toshiya Ogura, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/958,360

(22) PCT Filed: Feb. 13, 2001

(86) PCT No.: PCT/JP01/00981
§ 371 (c)(1),
(2), (4) Date: Mar. 15, 2002

(87) PCT Pub. No.: WO01/59643
PCT Pub. Date: Aug. 16, 2001

(30) Foreign Application Priority Data
Feb. 10, 2000 (JP) .......................................... 2000-038250

(51) Int. Cl.⁷ ............................................... G06F 19/00

(52) U.S. Cl. ........................ 700/245; 700/223; 700/224; 700/226; 700/227; 700/232; 700/234; 700/236; 700/253; 700/258; 700/259; 705/26; 705/27; 705/39; 705/40; 705/50; 705/52; 705/53; 705/80; 705/67; 709/203; 709/218

(58) Field of Search ............................. 700/245, 3, 215, 700/216, 221, 223–227, 234, 253, 258, 259, 232, 236; 705/1, 96, 67, 40, 50, 26, 64, 39, 14, 27, 52, 53, 80; 713/200, 201; 709/203, 218, 316

(56) References Cited

U.S. PATENT DOCUMENTS 6,483,536 B2 * 11/2002 Aoyama ...................... 348/139
6,505,098 B1 * 1/2003 Sakamoto et al. .......... 700/245

FOREIGN PATENT DOCUMENTS

| GB | 2322461 | 8/1998 |
| GB | 2335767 | 9/1999 |
| JP | 10-171879 | 6/1998 |
| JP | 11-203365 | 7/1999 |
| JP | 11-212921 | 8/1999 |

OTHER PUBLICATIONS

Thrun et al., Probabilistic algorithms and the interactive museum tour–guide robot minerva, 2000, Internet, pp. 1–35.*

Pogue, Looking at Aibo, the robot dog, 2001, Internet, pp. 1–6.*

(List continued on next page.)

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

The robotic apparatus is designed to act in a wider variety of manners, which will motivate the user of the robotic apparatus to purchase more products to the robotic apparatus. More specifically, a robotic apparatus (1) which acts autonomously recognizes a bar code (BC) or the like appended to a canned juice (100a) and acts in a predetermined manner. This is only enabled under a predetermined contract made between a product manufacturer and robotic apparatus manufacturer. The contract coverage is that the product manufacturer shall append the bar code (BC) to a specific product while the robotic apparatus manufacturer shall provide a robotic apparatus (1) which can act in a predetermined manner when having recognized the bar code (BC).

16 Claims, 16 Drawing Sheets

OTHER PUBLICATIONS

McDonley, I sense, therefore I feel moody, 1999, Internet, pp. 1–4.*

Sony Corporation, Aibo wireless LAN Card, 2000, Internet, pp. 36.*

"Shin VAIO C1R Denshi no Me wo Tsukaitaosu," Mobile PC, vol. 5, No. 4, Soft Bank K.K., Apr. 1, 1999, pp. 66–72.

"Robot Entertainment: Kogata 4 kyaku Jiritsu Robot," Nippon Robot Gakkaishi, vol. 16, No. 3, Apr. 15, 1998, pp. 313–314.

"Kore ga PC no Atarashii Tsukaikata: Shingata VAIO no Miryoku wo Tettei Kaibou," PC fan, vol. 5, No. 19, Kabushiki Kaisha Mainichi Communications, Oct. 15, 1998, pp. 8–13.

* cited by examiner

NODE₁₀₀

| NODE 100 | INPUT EVENT NAME | DATA NAME | DATA RANGE | PROBABILITY OF TRANSITION TO OTHER NODE (Di) | | | NODE 600 |
|---|---|---|---|---|---|---|---|
| TRANSITION DESTINATION NODE | | | | NODE 120 | NODE 120 | NODE 1000 | NODE 600 |
| OUTPUT ACTION | | | | ACTION 1 | ACTION 2 | MOVE BACK | ACTION 4 |
| 1 | BALL | SIZE | 0, 1000 | 30% | | | |
| 2 | PAT | | | | 40% | | |
| 3 | HIT | | | | 20% | | |
| 4 | MOTION | | | | | | |
| 5 | OBSTACLE | DISTANCE | 0, 100 | | | 50% | |
| 6 | | JOY | 50, 100 | | | 100% | |
| 7 | | SURPRISE | 50, 100 | | | | |
| 8 | | SADNESS | 50, 100 | | | | |

NODE₁₂₀

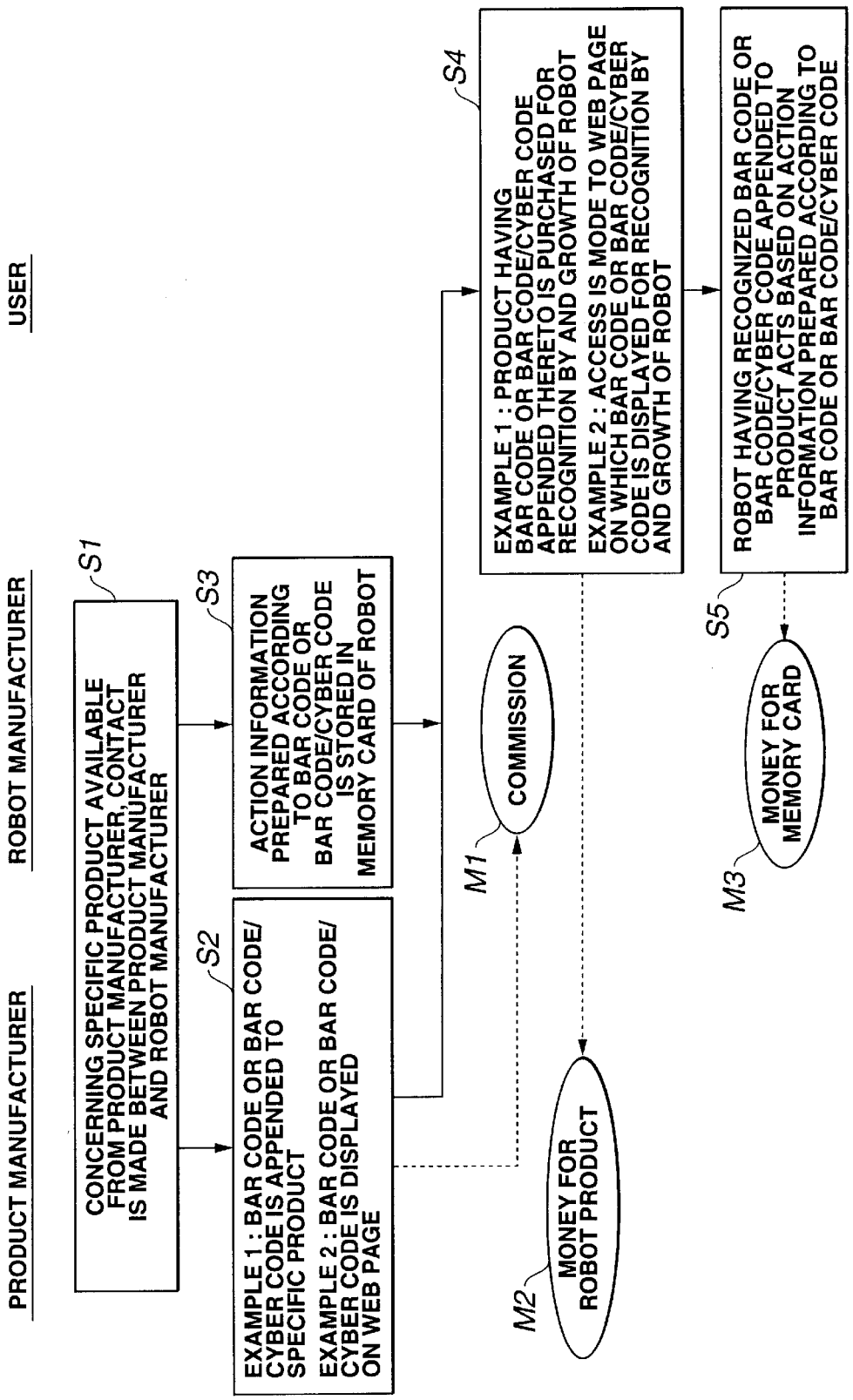

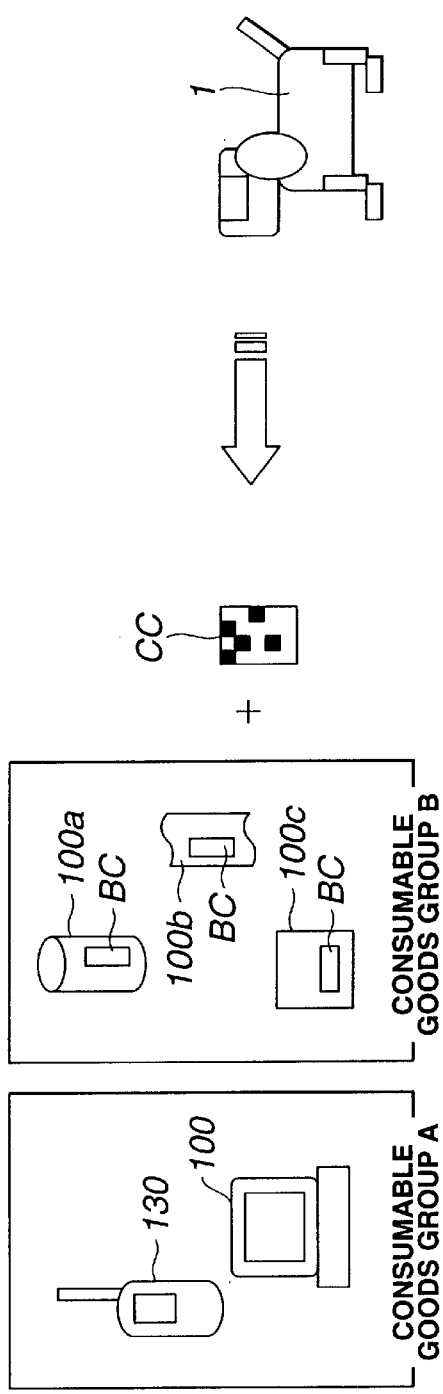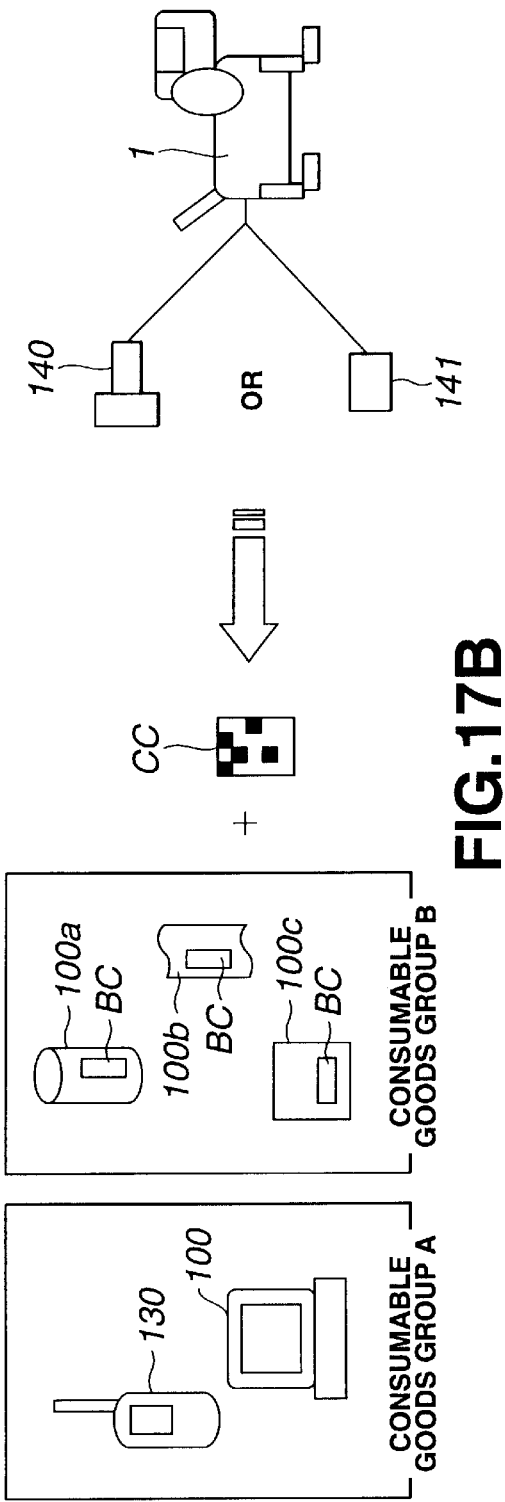

SYSTEM AND METHOD FOR GENERATING AN ACTION OF AN AUTOMATIC APPARATUS

TECHNICAL FIELD

The present invention relates to an automatic apparatus which acts automatically, method for generating an action of the automatic apparatus, information serving apparatus and method for storing information and serving a variety of information, robotic apparatus which acts autonomously, method for generating an action of the robotic apparatus, and a commercial transaction system and method in which the robotic apparatus is utilized.

BACKGROUND ART

Recently, there have been proposed robotic apparatuses each capable of autonomously deciding its own behavior correspondingly to its surrounding environment and internal state. Such robots include for example a type which can have a pseudo-emotion and -instinct (will be referred to as "emotion" and "instinct" hereunder) which are changed according to its environment and internal state, and behave correspondingly to such changes in emotion and instinct, that is, can reflect changes of its emotion and instinct in its action.

The action of the robotic apparatus will add to the fun of a user which enjoys playing with the robotic apparatus. Therefore, it has been more demanded by the users that the robotic apparatus can provide a wider variety of actions.

On the other hand, if the users' demands for such a wide variety of actions of the robotic apparatuses can be linked to another aspect, for example, to an enhanced motivation to purchase a certain merchandise or product which can be used with the robotic apparatus, the industries of the art will rise to prosperity. For example, if the robotic apparatus can be designed to act in response to a certain object (product), the latter will add to the user's enjoyment in playing with his or her robotic apparatus since the robotic apparatus can act in a correspondingly increased number of manners, and purchase by the users of such specific product will result in an increased sale by a manufacturer from which the specific product is available.

DISCLOSURE OF THE INVENTION

Accordingly, the present invention has an object to overcome the above-mentioned drawbacks of the prior art by providing an automatic apparatus which can automatically act in various manners and motivate the user of the automatic apparatus to purchase more products to the latter, a method for generating an action of the automatic apparatus, an information serving apparatus and method, a robotic apparatus, a method for generating an action of the robotic apparatus, and a commercial transaction system and method.

The above object can be attained by providing an automatic apparatus including: an attribute storage unit to store information on the attribute of a product; a product-related information reader to read, from a product, at least one of at least two pieces of information stored on the product and which concern the attribute of the latter; an information comparator to make a comparison between the information stored in the attribute storage unit and information read from the product-related information reader; the automatic apparatus being arranged to act in a predetermined manner when there is found a coincidence between the information as the result of comparison made in the information comparator.

In the automatic apparatus thus constructed, the product-related information reader reads, from a product, at least one of at least the two pieces of information stored on the product and which concern the attribute of the latter, and the information comparator makes a comparison between the information stored in the attribute storage unit and information read from the product-related information reader. When there is found a coincidence between the information as the result of comparison made by the information comparator, the automatic apparatus acts in the predetermined manner.

Thus, the automatic apparatus makes a predetermined action, as a robotic apparatus, based on the information stored on the product and concerning the attribute of the latter.

Also, the above object can be attained by providing a method for generating an action of an automatic apparatus, the method including steps of: reading, from a product, at least one of two pieces of information stored on the product and which concern the attribute of the latter; making a comparison between information pre-stored in an attribute storage unit and information read in the product-related information reading step; and allowing the automatic apparatus to act in a predetermined manner when there is found a coincidence between the information as the result of comparison made in the information comparing step.

By the method for generating an action of the automatic apparatus, the automatic apparatus such as a robotic apparatus is allowed to act in the predetermined manner based on the information stored on the product and which concerns the attribute of the latter.

Also, the above object can be attained by providing an information server including a sender to send information on the attribute of a product, cumulatively stored in an attribute storage unit included in an automatic apparatus, to a communication unit also included in the automatic apparatus; the automatic apparatus including: the attribute storage unit to store information on the attribute of a product; a product-related information reader to read, from a product, at least one of at least two pieces of information stored on the product and which concern the attribute of the latter; an information comparator to make a comparison between information stored in the attribute storage unit and information read from the product-related information reader; and the communication unit to store information into the attribute storage unit.

In the information server, the product attribute information sender sends information on the product attribute to the communication unit in the automatic apparatus, and in the automatic apparatus, the communication unit receives the attribute information sent from the sender in the information server and stores it into the attribute storage unit.

Also, the above object can be attained by providing an information serving method in which information on the attribute of a product is sent to a communication unit included in an automatic apparatus; the automatic apparatus including: an attribute storage unit to store information on the attribute of a product; a product-related information reader to read, from a product, at least one of at least two pieces of information stored on the product and which concern the attribute of the latter; an information comparator to make a comparison between information stored in the attribute storage unit and information read from the product-related information reader; and the communication unit to store information into the attribute storage unit.

By the above method, information on the attribute of a product is sent to the communication unit in the automatic apparatus and thus the communication unit in the automatic apparatus in the automatic apparatus receives the sent attribute information and stores it into the attribute storage unit.

Also, the above object can be attained by providing an information server which reads attribute information sent from a communication unit included in an automatic apparatus and sends, to the communication unit, action-generation information intended to generate a predetermined action of the automatic apparatus when the read attribute information coincides with predetermined information; the automatic apparatus including: a product-related information reader to read, from a product, at least one of two pieces of information stored on the product and which concern the attribute of the latter; a controller to generate an action; and the communication unit to supply the controller with information intended to generate an action of the automatic apparatus, acquire the attribute information read by the product-related information reader and send the acquired attribute information.

In the information server thus constructed, the attribute information sent from the communication unit in the automatic apparatus is read, and when the read attribute information coincides with the predetermined information, the action-generation information intended to generate the predetermined action is sent to the communication unit of the automatic apparatus. Then, the automatic apparatus generates an action by means of the controller on the basis of the action-generation information.

Also, the above object can be attained by providing an information serving method including steps of: reading attribute information sent from a communication unit included in an automatic apparatus; and sending, to the communication unit, action-generation information intended to generate a predetermined action of the automatic apparatus when the read attribute information coincides with predetermined information; the automatic apparatus including: a product-related information reader to read, from a product, at least one of two pieces of information stored on the product and which concern the attribute of the latter; a controller to generate an action; and the communication unit to supply the controller with information intended to generate an action of the automatic apparatus, acquire the attribute information read by the product-related information reader and send the acquired attribute information.

By the above information serving method, the attribute information sent from the communication unit in the automatic apparatus is read, and when the read attribute information coincides with the predetermined information, the action-generation information intended to generate the predetermined action is sent to the communication unit in the automatic apparatus. Then, in the automatic apparatus, an action is generated by the controller on the basis of the action-generation information.

Also, the above object can be attained by providing a robotic apparatus of an autonomous type which acts autonomously based on an external factor and/or an internal factor, the apparatus including: a memory having stored therein information on a contract made between a manufacturer or distributor of the robotic apparatus and a third party; the robotic apparatus reading information stored on a product and which concern at least a supply source of the product; and the robotic apparatus generating a predetermined action or reaction when the supply source is found from the contract-related information to have made a predetermined contract with the manufacturer or distributor.

The above robotic apparatus will generate the predetermined action or reaction when the supply source of the product is ascertained based on the contract-related information stored in the memory to have made the predetermined contract with the robotic apparatus manufacturer or distributor.

Also, the above object can be attained by providing a method for generating an action of an autonomous type robotic apparatus which acts autonomously based on an external factor and/or internal factor, in which: the robotic apparatus has a memory having stored therein information on a contract made between a manufacturer or distributor of the robotic apparatus and a third party; the method comprising steps of: reading information stored on a product and which concerns at least a supply source of the product; and generating a predetermined action or reaction when the supply source is found from the contract-related information stored in the memory to have made a predetermined contract with the manufacturer or distributor.

By the robotic apparatus action-generation method, the robotic apparatus acts or reacts in a predetermined manner when the supply source is found from the contract-related information stored in the memory to have made the predetermined contract with the manufacturer or distributor.

Also, the above object can be attained by providing a commercial transaction system including: a robotic apparatus manager that manages a robotic apparatus so that the robotic apparatus acts or reacts when it detects predetermined information; a product distributor that acquires the predetermined information under a contact having been made with the robotic apparatus manager, appends it to a product for sale to a user of the robotic apparatus; and the robotic apparatus which detects the predetermined information appended to the product purchased by the user and acts or reacts in a predetermined manner based on the detected predetermined information.

In the above commercial transaction system, the robotic apparatus is managed by the robotic apparatus manager to act or react based on the detected predetermined information, the predetermined information acquired under the contract made with the robotic apparatus manager is appended to the product and sold to the user by the product distributor, the robotic apparatus detects the predetermined information appended to the product purchased by the user and acts or reacts in the predetermined manner based on the detected information. That is, the robotic apparatus will acts or reacts in the predetermined manner in response to the contract-based product on the basis of the predetermined information. On the other hand, the product is purchased by the user for such an action or reaction of his or her robotic apparatus.

Also, the above object can be attained by providing a commercial transaction method in which a product distributor that sells a product makes a contract with a robotic apparatus manager that manages a robotic apparatus so that the robotic apparatus acts or reacts based on detected predetermined information; the product distributor acquires predetermined information under the contract and appends it to the product for sale to a user; and the robotic apparatus detects the predetermined information appended to the purchased product and acts or reacts in a predetermined manner on the basis of the detected predetermined information.

By the above commercial transaction method, the robotic apparatus is allowed act or react in the predetermined manner in response to the contract-based product on the basis of the predetermined information. On the other hand, the product is purchased by the user for such an action or reaction of his or her robotic apparatus.

BRIEF DESCRIPTION OF THE DRAWINGS

FIG. 5 shows a state transition table.

FIG. 7 is a flow chart of transactions made among the product manufacturer, robot manufacturer and user.

FIG. 17 explains reading of a bar code/cyber code by a dedicated reader such as a bar code reader.

BEST MODE FOR CARRYING OUT THE INVENTION

The present invention will be further discussed below concerning an embodiment thereof with reference to the accompanying drawings. The embodiment of the present invention is an autonomous type robotic apparatus which acts autonomously according to an external factor and/or internal factor. The robotic apparatus according to the present invention is constructed as will be explained below.

Figure 1:
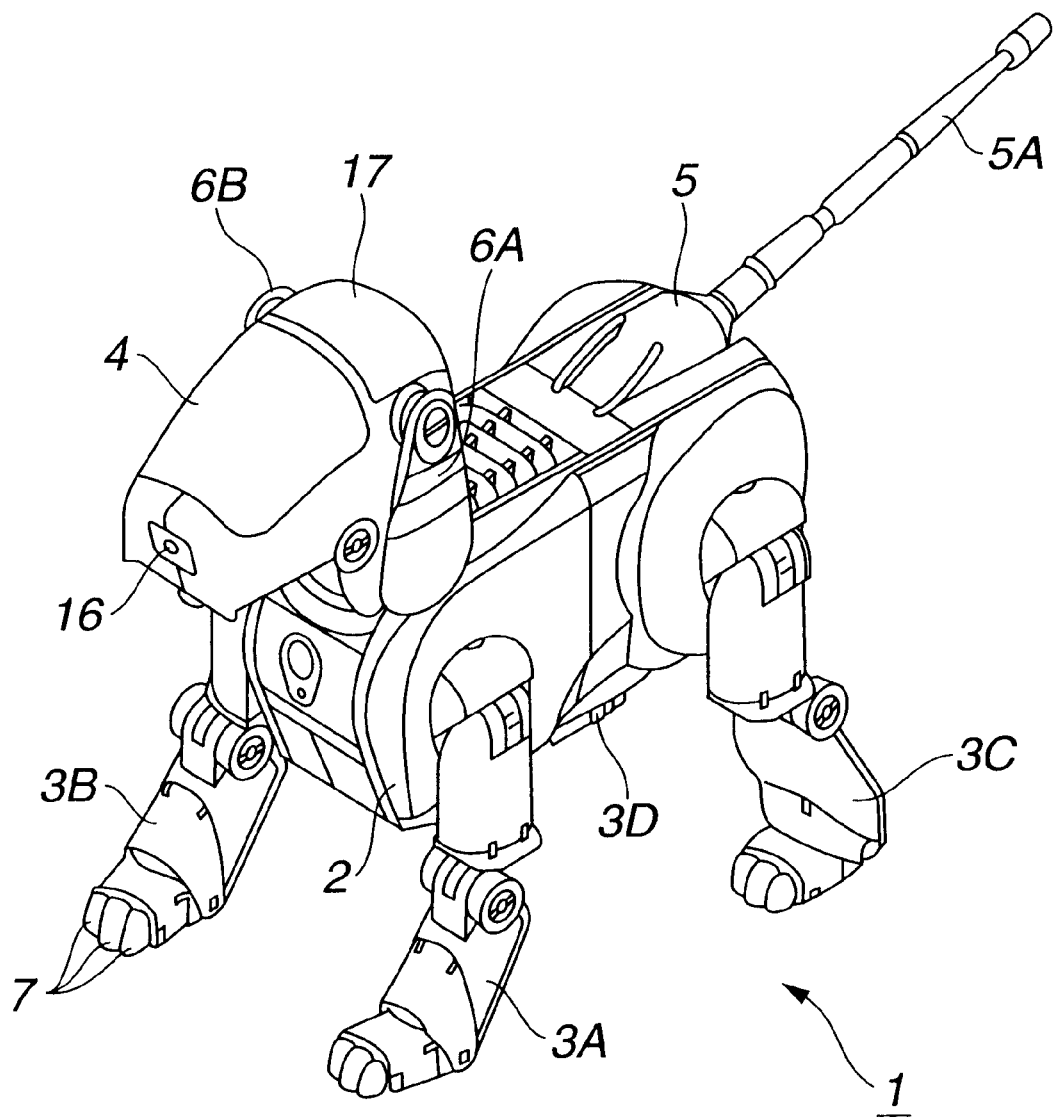
FIG. 1 is a perspective view of a robotic apparatus composed of components on which the information service system according to the present invention serves information.

(1) Construction of the Robotic Apparatus
(1-1) Construction of the Robotic Apparatus According to the Present Invention As shown in FIG. 1, the robotic apparatus (will be referred to simply as "robot" hereunder) is generally indicated with a reference 1. The robot 1 includes a body unit 2 having leg units 3A to 3D joined at the front right and left and rear right and left thereof, and a head unit 4 and tail unit 5 joined at the front and rear ends thereof.

Figure 2:
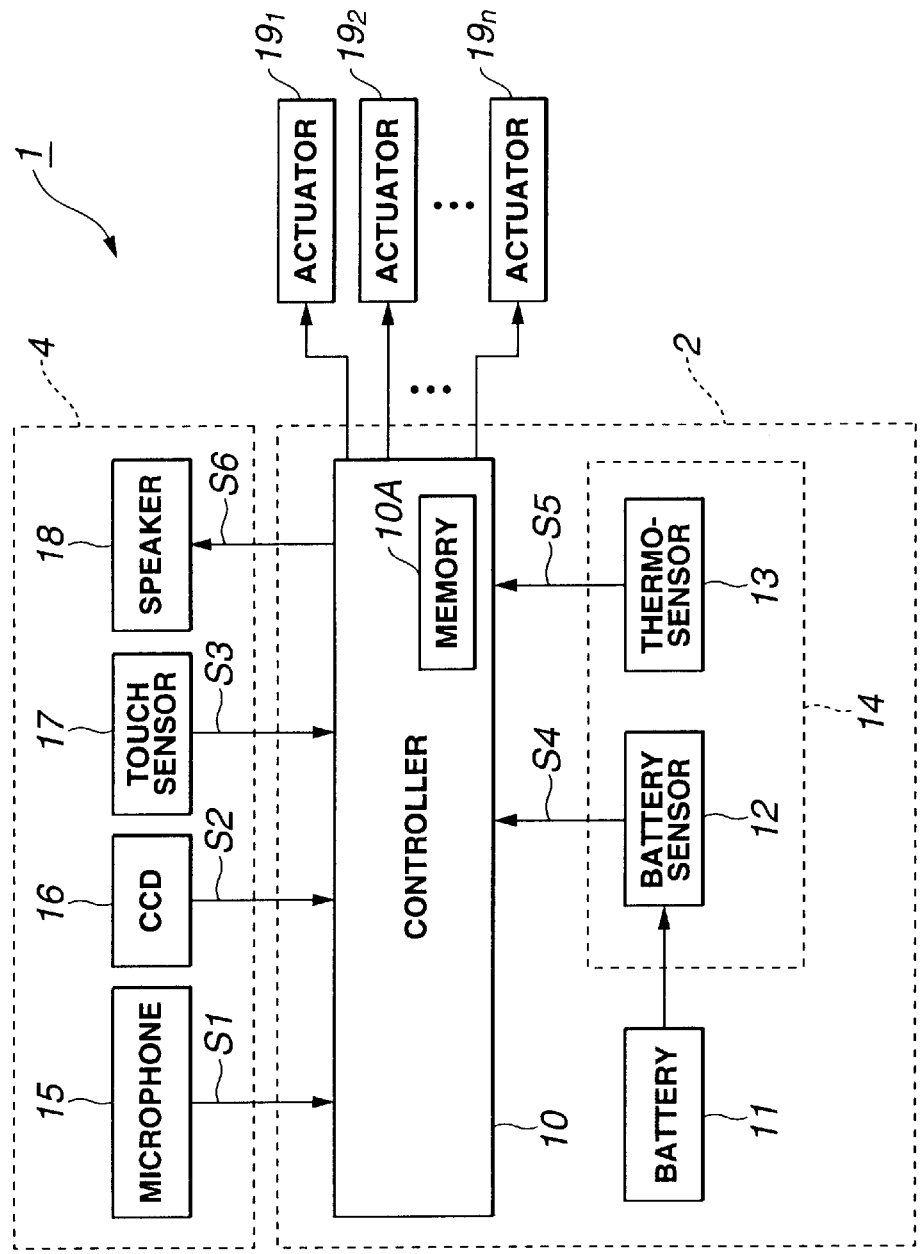
FIG. 2 is a block diagram showing the circuit configuration of the robotic apparatus in FIG. 1.

As shown in FIG. 2, the body unit 2 houses a controller 10 to control the operations of the entire robot 1, a battery 11 to supply a power to the robot 1, an internal sensor unit 14 including a battery sensor 12 and thermo-sensor 13 and others.

The head unit 4 houses a microphone 15 working as "ears" of the robot 1, a CCD (charge coupled device) camera 16 as "eyes", a sensor 17, and a speaker 18 as "mouth", disposed in place, respectively.

Further, actuators $19_1$ to $19_n$ are disposed in joints of the leg units 3A to 3D, articulations between the leg units 3A to 3D and body unit 2, an articulation between the head unit 4 and body unit 2, and in an articulation between the tail unit 5 and body unit 2, respectively.

The microphone 15 in the head unit 4 receives a command sound such as "Walk!", "Be prone!" or "Chase the ball!" given as scales to the robot 1 via a sound commander (not shown) from the user to produce a sound signal S1, and sends the sound signal S1 to the controller 10. Also, the CCD camera 16 captures the environment surrounding the robot 1 to produce an image signal S2, and sends the image signal S2 to the controller 10.

As shown in FIG. 1, the touch sensor 17 is located at the top of the head unit 4. It detects a pressure applied thereto by a physical action of the user such as "patting", "hitting" or the like, and sends the detected pressure as.a pressure detection signal S3 to the controller 10.

The battery sensor 12 in the body unit 2 detects the remaining potential in the battery 11, and sends the detected potential as a battery potential detection signal S4 to the controller 10. The thermo-sensor 13 detects the head inside the robot 1 and sends the detected heat as a heat detection signal S5 to the controller 10.

Based on the sound signal S1, image signal S2, pressure detection signal S3, battery potential detection signal S4 and heat detection signal S5 supplied from the microphone 15, CCD camera 16, touch sensor 17, battery sensor 12 and thermo-sensor 13, respectively, the controller 10 judges in what environment the robot 1 stands, and if the user has made any instruction or any action to the robot 1.

The controller 10 decides how to behave or move based on the result of judgment and a control program including a variety of control parameters stored in a memory 10A in advance, and drives, based on the result of decision, an appropriate one of the actuators $19_1$ to $19_n$ to allow the robot 1 to make a behavior or motion by shaking or nodding the head unit 4, wagging a tail 5A of the tail unit 5 or driving each of the leg units 3A to 3D to walk. In the following, a set of behaviors and motions will be referred to as "action".

Also, the controller 10 supplies a predetermined sound signal S6 to the speaker 18 as necessary to provide a sound based on the sound signal S6 to outside and turn on and off an LED (light emitting diode) (not shown) provided at each "eye" position of the robot 1.

Thus, the robot 1 is adapted to autonomously act based on its environment, control program stored in the memory 10A, etc.

(1-2) Software Configuration of the Control Program

Figure 3:
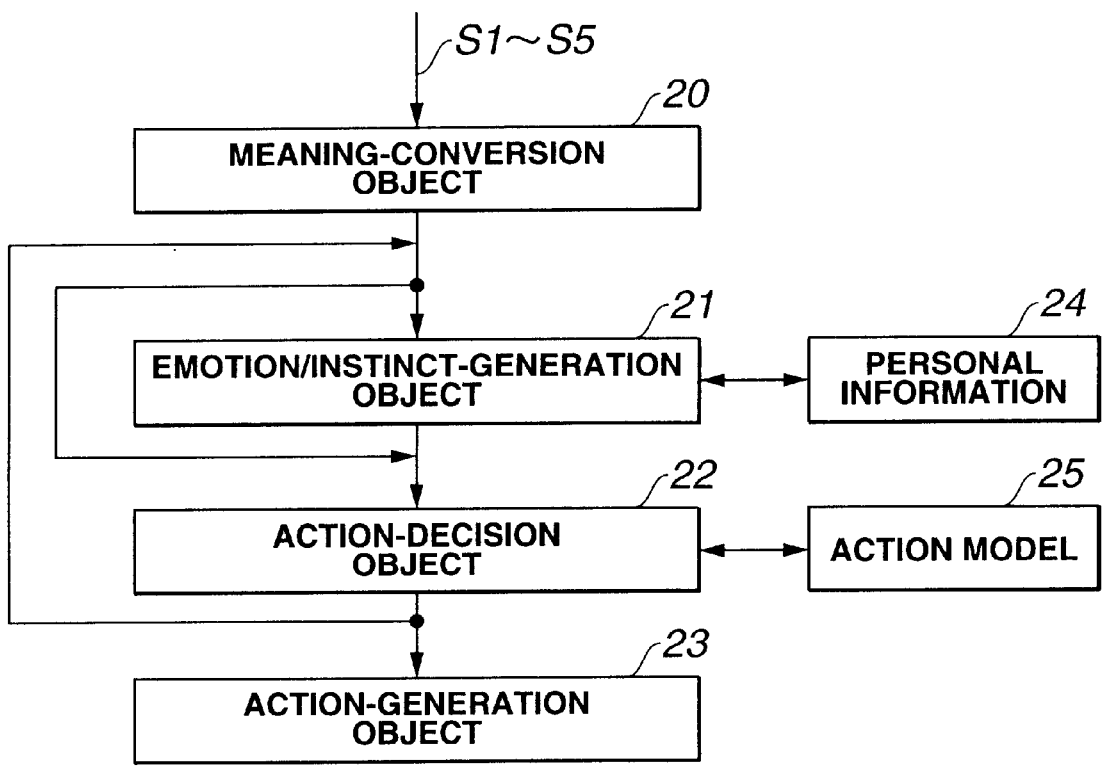
FIG. 3 is a block diagram showing the configuration of a software for the robotic apparatus in FIG. 1.

FIG. 3 shows the software configuration of the above-mentioned control program used in the robot 1. As shown, the control program includes a meaning-conversion object 20, emotion/instinct-generation object 21, action-decision object 22 and an action-generation object 23.

In the above software configuration, the meaning-conversion object 20 recognizes external and internal states of the robot 1. More particularly, the meaning-conversion object 20 recognizes the external and internal states based on results of detection by various sensors. And, the meaning-conversion object 20 supplies the result of recognition to the emotion/instinct-generation object 21 and action-decision object 22.

The emotion/instinct-generation object 21 generates information intended for the robot 1 to express its emotion or instinct by an action. Specifically, the emotion/instinct-generation object 21 decides the states of emotion and instinct based on the result of recognition supplied from the meaning-conversion object 20 and various other information. And, if the emotion or instinct exceeds a predetermined level, the emotion/instinct-generation object 21 supplies it to the action-decision object 22.

The action-decision object 22 decides an action to be done by the robot 1. More particularly, the action-decision object 22 decides a next due action of the robot 1 based on the result of recognition supplied from the meaning-conversion object 20 and information supplied from the emotion/instinct-generation object 21. The action-decision object 22 informs the action-generation object 23 of the result of decision.

The action-generation object 23 controls the robot 1 to actually make a behavior or motion. Namely, the action-generation object 23 controls relevant devices of the robot 1 based on the information (result of decision) supplied from the action-decision object 22 to behave or act as specified by the information.

Thus the control program is composed of the above-mentioned plurality of products to control the operation of the robot 1. Each of the products will further be described below.

Based on a sound signal S1, image signal S2, pressure detection signal S3, battery potential detection signal S4 or heat detection signal S5 from the microphone 15, CCD camera 16, touch sensor 17, battery sensor 12 and thermo-sensor 13, respectively, the meaning-conversion object 20 recognizes predetermined external and internal states of the robot 1 such as "the robot 1 has been hit", "the robot 1 has been patted", "the robot 1 has detected the ball", "the battery potential has become lower" or "the internal temperature has been elevated". Then it supplies the result of recognition to the emotion/instinct-generation object 21 and action-decision object 22.

Based on the result of recognition supplied from the meaning-conversion object 20, personal information 24 which is one of the control parameters stored in the memory 10A, and information representing an action having been done and supplied from the action-decision object 22 as will further be described later, the emotion/instinct-generation object 21 decides emotion and instinct levels of the robot 1. When the emotion and instinct levels exceed predetermined ones, the emotion/instinct-generation object 21 supplies the emotion and instinct levels to the action-decision object 22.

More particularly, the emotion/instinct-generation object 21 has an emotion model holding a total of six parameters each representing the strength of emotions including "joy", "sadness", "anger", "surprise", "fear" and "aversion", respectively, and an instinct model holding a total of four parameters representing the strength of desires for "love", "search (curiosity)", "motion" and "eating", respectively.

The memory 10A has also stored therein, as the personal information 24, data such as one of emotion or desire parameters which has to be increased or decreased in value in response to a result of recognition from the meaning-conversion object 20 and information from the action-decision object 22 noticing that an action has been done and which will further be described later and. For example, when the personal information 24 is that the robot 1 has been "hit", the value of the "angry" parameter is increased while that of the "joy" parameter is decreased. When the robot 1 has been "patted", the value of "joy" parameter is increased while that of the "angry" parameter is decreased. When the robot 1 has made an action, the value of the "desire for motion" parameter and that of the "joy" parameter are both increased.

In response to a result of recognition supplied from the meaning-conversion object 20, information supplied from the action-decision object 22, etc., the emotion/instinct-generation object 21 periodically updates the value of an appropriate emotion or desire parameter in the emotion or instinct model on the basis of the personal information.

When as a result of updating of each parameter value, the value of any emotion or desired parameter exceeds a preset value for the emotion or instinct, the emotion/instinct-generation object 21 informs the action-decision object 22 of the fact.

The action-decision object 22 decides a next action based on a result of recognition supplied from the meaning-conversion object 20, information from the emotion/instinct-generation object 21 and an action model 25 which is one of the control parameters stored in the memory 10A, and supplies the action-generation object 23 with the result of decision.

Figure 4:
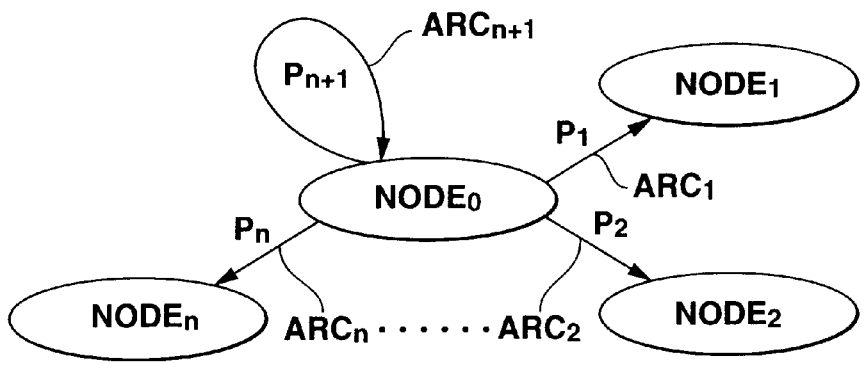
FIG. 4 shows a probabilistic automaton.

Note that in this embodiment of the present invention, the action-decision object 22 adopts, as a measure for decision of a next action, an algorithm called "probabilistic automaton" to stochastically decide one of nodes $NODE_0$ to $NODE_n$ shown in FIG. 4 to which a transition is to be made from the node $NODE_0$, based on transition probabilities $P_1$ to $P_{n+1}$ set for arcs $ARC_1$ to $ARC_{n+1}$, respectively, which provide connections between the nodes $NODE_0$ to $NODE_n$.

More specifically, the memory 10A has stored therein, as the action model 25, a state transition table 26 as shown in FIG. 5 for each of the nodes $NODE_0$ to $NODE_n$. The action-decision project 22 is adapted to set a next action according to the state transition table 26.

That is, in the state transition table 26, input events (results of recognition) taken as conditions for transition between the nodes $NODE_0$ to $NODE_n$ are entered in an "Input event name" column in the order of precedence, and additional conditional data to the transition conditions are entered in "Data name" and "Data range" columns.

Therefore, as shown in the state transition table 26 in FIG. 5, it is a condition for a node $NODE_{100}$ to transit to another node that when a result of recognition that "BALL (the robot 1 has detected the ball)" is given, "SIZE (ball size)" given together with the result of recognition is "0, 1000 (0 to 1000)". Also, the node $NODE_{100}$ can make a transition to another node when "OBSTACLE (the robot 1 has detected an obstacle)" is given as a result of recognition and "DISTANCE (distance between the obstacle and robot 1)" given along with the result of recognition is "0, 100 (0 to 100)".

Also, the node $NODE_{100}$ can make a transition to another node when any of the parameters "JOY", "SURPRISE" and "SADNESS" included in the emotion and desire parameters in the emotion and instinct models in the emotion/instinct-generation object 21 to which the action-decision object 22 refers periodically takes a value of "50, 100 (50 to 100)" even with entry of no result of recognition.

In the state transition table 26, names of the nodes to which each of the nodes $NODE_0$ to $NODE_n$ can make a transition are given in a "Transition destination nodes" line covered by a "Probability of transition to other node (Di)" column, and probabilities of transition to other nodes $NODE_0$ to $NODE_n$, which would be when all the requirements given in the "Input event name", "Data name" and "Date range" columns, respectively, are satisfied are given in an "Output action" line covered by the "Probability of transition to other node (Di)" column. Note that the sum of the transition probabilities in the line covered by the "Probability of transition to other node Di" column is 100(%).

Therefore, the node $NODE_{100}$ in the state transition table 26 shown in FIG. 5 can make a transition to a node $NODE_{120}$ (node 120) with a transition probability of "30%" when "BALL (the bal has been detected)" is given as a result of recognition and "SIZE (the size of the ball)" given along with the result of recognition is "0, 1000 (0 to 1000)". At this time, the robot 1 will make an action "ACTION 1".

The action model 25 is constructed so that many of the nodes $NODE_0$ to $NODE_n$ given in the state transition table 26 are connected to each other. When a result of recognition is supplied from the meaning-conversion object 20 or when a notice is supplied from the emotion/instinct-generation object 21, the action-decision object 22 is adapted to stochastically decide a next action or motion by using the state transition table 26 stored in the memory 10A for appropriate ones of the nodes $NODE_0$ to $NODEN_n$ and inform the action-generation object 23 of the result of decision.

The action-generation object 23 drives and controls an appropriate one of the actuators $19_1$ to $19_n$ as necessary based on the information from the action-decision object 22 for the robot 1 to act or move as specified, generates an appropriate sound signal S6 (as shown in FIG. 2) based on a corresponding sound data in a sound data file which is one of the control parameters stored in the memory 10A, and sends it to the speaker 18, or turns on and off the LED at the "eye" position in a corresponding light-emission pattern on the basis of a corresponding light emission data in a light emission data file which is one of the control parameters stored in the memory 10A.

Thus, the robot 1 can make an autonomous action correspondingly to its own state and surrounding environment, and a user's instruction and operation made to the robot 1 on the basis of the control program.

Next, the growth model incorporated in the robot 1 to have the latter act in each of its growth steps will be described.

The growth model is to allow the robot 1 to show an "advanced action" in each higher "growth" step like a real animal on which the robot 1 is modeled.

Namely, the growth model allows the robot 1 to make an action corresponding to each level of growth (degree of growth). More specifically, the robot 1 is designed to act in each of four "growth steps" including "infancy", "boyhood", "adolescence" and "adulthood" according to the growth model.

The growth model includes the above-mentioned action model (action-decision object) for each of the four "growth steps" including "infancy", "boyhood", "adolescence" and "adulthood". A model corresponding to each growth step is selected to have the robot 1 act correspondingly to its step of growth. For example, a difference between two successive ones of the "growth steps" in the growth model is such that an action or motion in a higher growth step is more difficult or complicated than in the precedent growth step.

More specifically, the action model for the "infancy" is such that for example "walking" is "toddling" with short steps and "motions" are "simple" ones such as "toddle", "stand", "lie" and the like. "Action" is a "onotonous" one such as repetition of a motion, and "sound" is a "low and short" one amplified by a low factor.

A transition is made from one to another step of growth by always monitoring and counting occurrence of a plurality of elements (will be referred to as "growth element" hereunder) associated with a predetermined "growth" such as a predetermined action and motion.

More particularly, when a sum of cumulative occurrences of each growth element (will be referred to as "total empirical value of growth element" hereunder) in which the cumulative occurrences (count) of the growth element are taken as information indicative of a growth degree of the growth element, exceeds a preset threshold, another action model is selected for use, that is, a transition is made from for example the "infancy" action model to the "boyhood" one which higher in growth level (difficulty and complexity of action or motion) than the "infancy" action model, thereby allowing a transition to a next growth step.

It should be reminded here that the growth elements include for example input of a command by scale from a sound commander (in a remote controller), input of "padding" and "hitting" from the touch sensor 17, intensified learning including a number of successes in a predetermined action and motion, input of other than "padding" and "hitting" from the touch sensor 17, and a predetermined action and motion such as "playing with a ball".

Then, after transition of the growth step from the "infancy" action model, the action model for the "boyhood" is followed to control the actuators $19_1$ to $19_n$ and sound output from the speaker 18 in order to increase the rotation speed of each of the actuators $19_1$ to $19_n$ for a "little more positive" walking, increase the number of "motions" for a "little more advanced and complicate" motion, decide a next "action" with reference to the preceding "action" for an "action with a little more definite intention", and increase the length of "sound" signal and amplify the signal with an increased factor for a "little longer and louder" cry.

Similarly, each time the total empirical value of the growth element exceeds each of thresholds preset for the "adolescence" and "adulthood" after transition through the "boyhood", the action model is sequentially changed to the "adolescence" or "adulthood" higher in "growth step" than the "boyhood" and each of these action models is followed to gradually increase the rotation speed of the actuators $19_1$ to $19_n$ and the length and amplification factor of a sound signal supplied to the speaker 18.

Following the growth model, the robot 1 "toddling" in its "infancy" can "walk more positively" as the "growth step" rises (namely, the action model transits from the "infancy" to the "boyhood", from the "boyhood" to the "adolescence", and from the "adolescence" to "adulthood"), the robot 1 "moving simply" in its "infancy" can "move in a more advanced and complicated manner", and the robot 1 acting "monotonously" in its "infancy" can "act with an intention. Also, the robot 1 can generate a "longer and louder" sound as it grows while it has made a "low and short" sound in its "infancy".

Following the growth model, the robot 1 can make an autonomous action in each of the growth steps correspondingly to its own state and surrounding environment and user's instruction and action made to the robot 1.

(2) Various Effects of the Robot 1

Various effects of the aforementioned robot 1 according to the present invention will be described hereinbelow. They can be attained primarily in (1) Contract making between a product manufacturer and robot manufacturer and implementation of the contract; and (2) Action made by the robot 1 having read a bar code appended to the product under the contract.

Information on the attribute of a product includes for example a bar code of at least a manufacturer of the product (information indicative of a supply source of the product), bar code including information which contains a code of a product produced by the product manufacturer, and so-called cyber code being reaction-generation information corresponding to the bar code and intended to allow the robot to react in a predetermined manner. Also, the products are produced by the product manufacturers, and refer herein to consumable goods related to clothing, eating and living, for example.

(2-1) Contact to be Made Between Product and Robot Manufacturers

Figure 6:
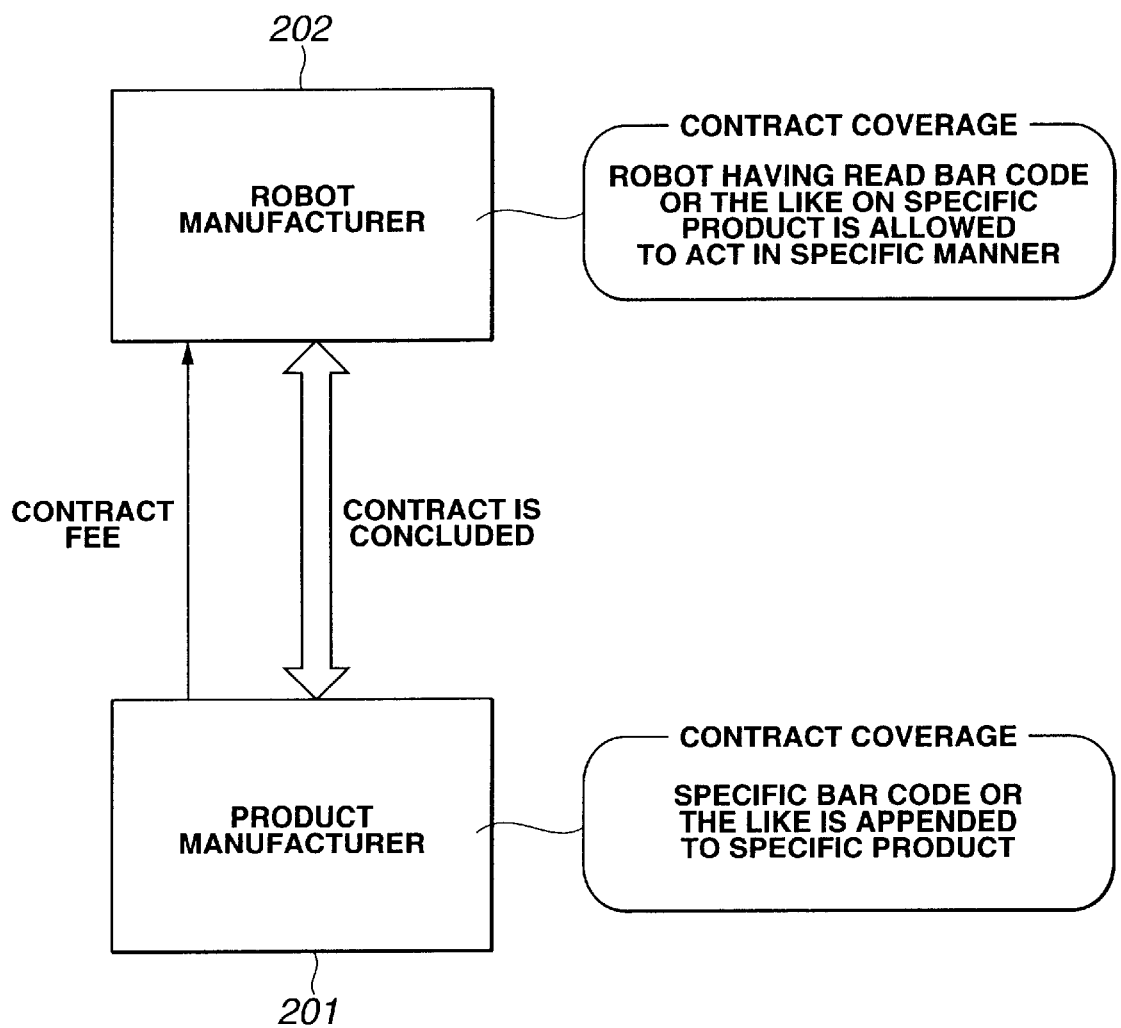
FIG. 6 is a block diagram explaining a contract made between the product manufacturer and robot manufacturer.

As shown in FIG. 6, a contract is made between a robot-access manufacturer 201 and a robot manufacturer 202 which produces the robot 1 itself concerning a specific product or products produced by the product manufacturer for use with the robot 1 (in step S1 in FIG. 7). The contract covers that the product manufacturer 201 shall append a predetermined bar code or cyber code to a specific product included in the contract and the robot manufacturer 202 shall provide a robot 1 which can act in a predetermined manner when reading the bar code or cyber code appended to the specific product.

Figure 8A:
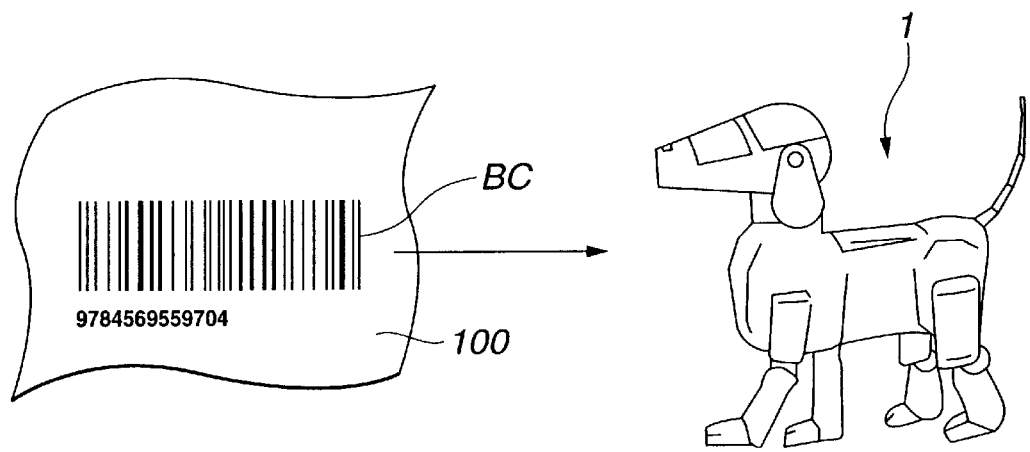
FIG. 8 shows a bar code or a bar code/cyber code appended to a product, the bar code or bar code/cyber code being viewed by the robot.
Figure 8B:
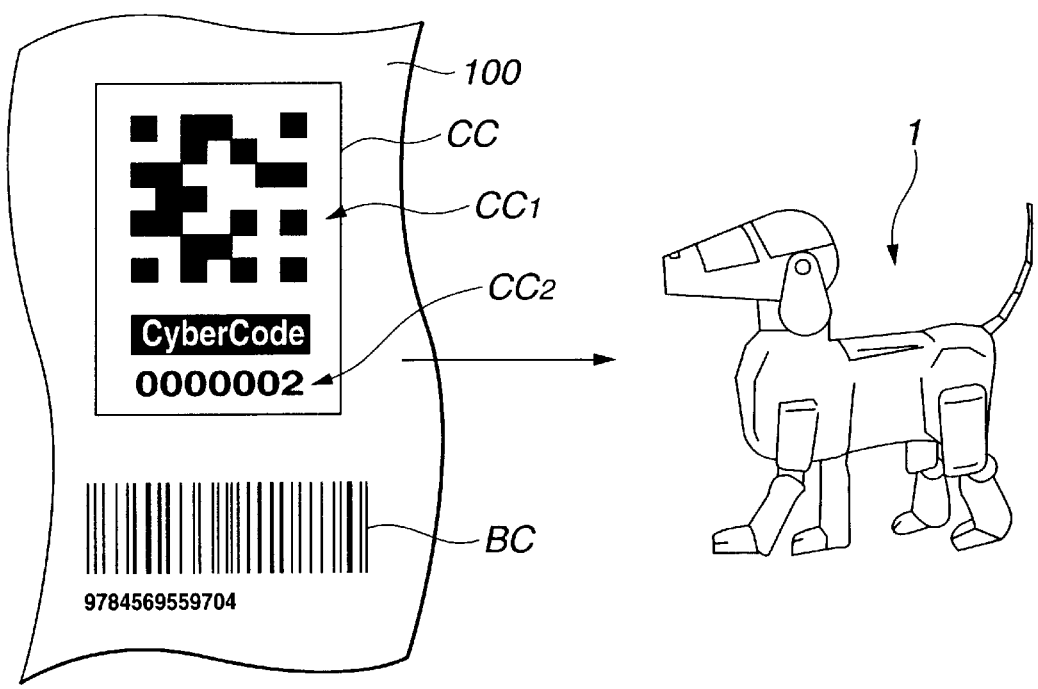

That is, as shown in FIG. 8A, the robot 1 having read a bar code BC appended by the product manufacturer 201 to its product 100 under the contact, will act in a predetermined manner, which is assured by the robot manufacturer under the contract. Also, as shown in FIG. 8B, the robot 1 having read a combination of a bar code BC and a cyber code CC appended by the product manufacturer 201 to its product 100 under the contact, will act in a predetermined manner, which is assured by the robot manufacturer under the contract. In this embodiment, the cyber code CC is composed of a pattern $CC_1$ and a number $CC_2$ as shown in FIG. 8B.

Also, when a combination of bar code BC and cyber code CC is appended to the product, a plurality of patterns (a plurality of types) is prepared for the cyber code CC and is appended to products, respectively, of the same type. Thus, each of the products of the same type has appended thereon a unique combination of bar code BC and cyber code CC.

Only a bar code BC is appended to a specific product as shown in FIG. 8A in one case, while a combination of bar code BC and cyber code CC is appended to a specific product as shown in FIG. 8B in another case. The reason for this difference will be described later. In the embodiment shown in the accompanying drawings, a combination of bar code BC and cyber code CC is appended to a product. Note however that there is possible a case in which only a bar code BC is appended to a product.

The present invention will be described in detail herebelow. Under the contract, the product manufacturer appends, in step S2, either a bar code BC or a combination of bar code BC and cyber code CC to a specific product for sale as shown in FIG. 7.

Figure 9A:
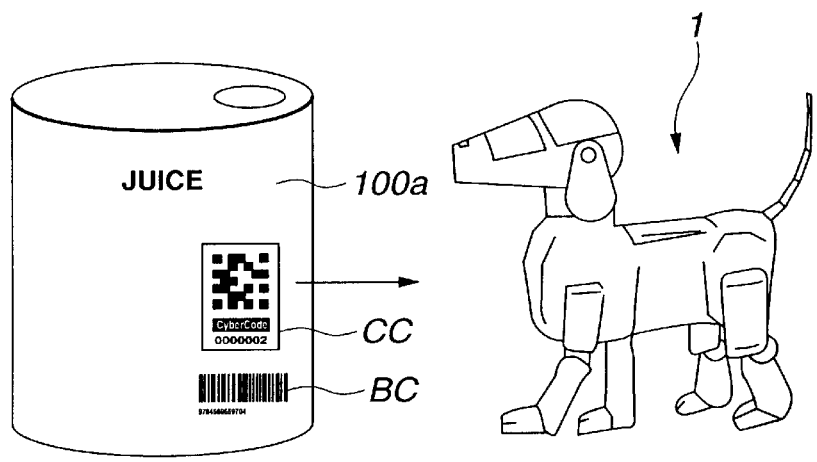
FIG. 9 shows a bar code or a bar code/cyber code appended to each of consumable goods such as juice, candy and compact disc, the bar code or bar code/cyber code being viewed by the robot.
Figure 9B:
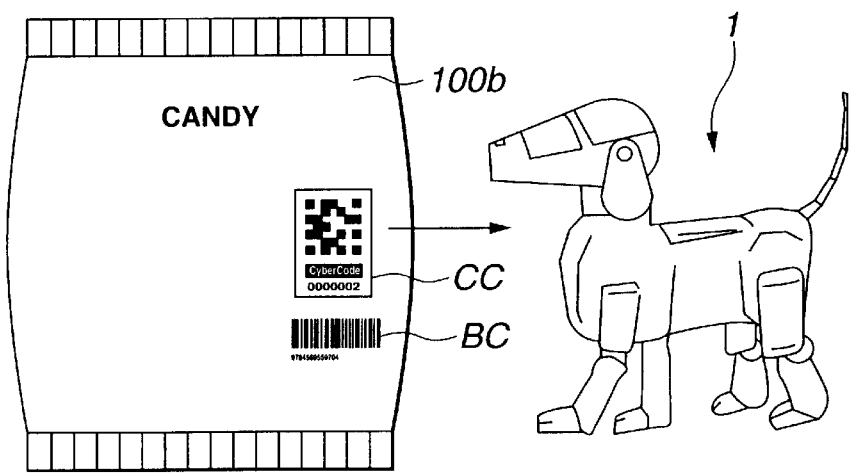

In case the product available from the product manufacturer is juice or candy for example, a combination of bar code BC and cyber code CC is appended to a canned juice 100a for sale as shown in FIG. 9A or a combination of bar code BC and cyber code CC is appended to a bagged candy 100b for sale as shown in FIG. 9B. According to the coverage of the contract, only a bar code BC is appended to such a product. Generally, such food manufacturer produces many foods. However, the contract may specify that the manufacturer shall append either a bar code BC or a combination of bar code BC and cyber code CC to limited ones of its products as a specific product.

Figure 9C:
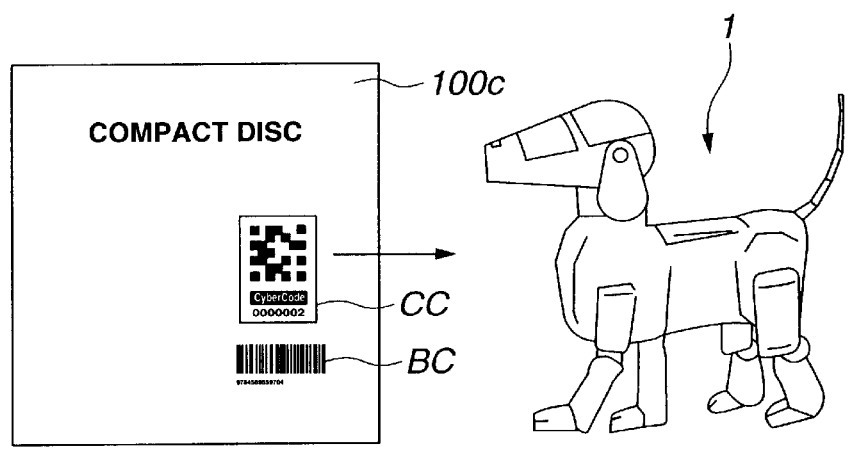

The specific products are not limited to foods. That is to say, the specific product may be a compact disc (CD). In this case, the CD manufacturer appends a combination of bar code BC and cyber code CC or a bar code BC to a compact disc case 100c for sale as shown in FIG. 9C.

Figure 10:
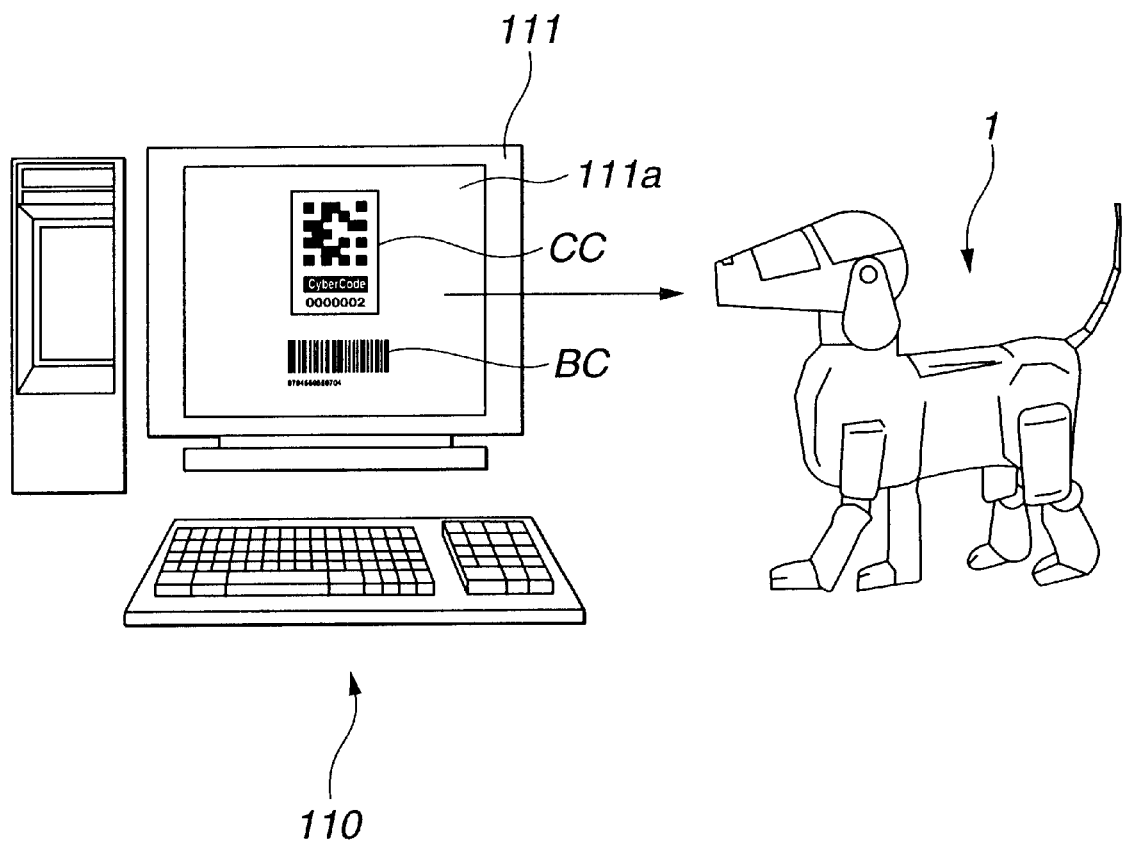
FIG. 10 shows a bar code or a bar code/cyber code displayed on the screen of a personal computer display unit, the bar code or bar code/cyber code being viewed by the robot.

Also, the product manufacturer may display a bar code BC or a combination of bar code BC and cyber code CC on a so-called Web page started for itself. For example, on the Web page (home page on the Web), a bar code BC or a combination of bar code BC and cyber code CC is displayed correspondingly to a specific product. Thus, the user who accesses the Web page by operating a personal communication device (terminal) such as a personal computer, will be able to view the bar code BC and cyber code CC on a screen 111a of a monitor 111 of his or her personal computer 110 as shown in FIG. 10. Alternatively, only a bar code BC is displayed depending upon the contract coverage.

On the other hand, the robot manufacturer arranges, under the contract, the robot 1 in step S3 in FIG. 7 so that when having read the bar code BC or a combination of bar code BC and cyber code CC, it will act in a predetermined manner. This will be described in detail below.

As having previously been described, the robot 1 is constructed to do a predetermined action according to an external factor and/or internal factor. In the robot 1, the predetermined action depends upon action information (action-generation information). Further, the robot 1 holds such action information as stored in a removable information storage medium. For example, the information storage medium includes a memory card such as "Memory Stick" (trade name of a memory card available from the Sony).

Thus, for an action in the predetermined manner of the robot 1 having read the bar code BC or combination of bar code BC and cyber code CC, the robot manufacturer stores, into the memory card of the robot 1, such action-generation information as will allow the robot 1 to act in the predetermined manner when having detected the bar code BC or the combination of bar code BC and cyber code CC as an external factor, that is, when having picked up the bar code BC or the combination of bar code BC and cyber code CC by means of the CCD camera 16 shown in FIG. 2 or the like.

The "predetermined action" refers herein to information on an action pattern the robot 1 will not usually make even when the aforementioned states of emotion, instinct and growth (parameters or the like) have changed.

For example, the predetermined action should be a one an animal will normally make in response to a product having appended thereto a bar code BC or a combination of bar code BC and cyber code CC. More particularly, a dog will "lick" milk, and in case the specific product is "milk", the robot 1 of a dog type should output a "licking" sound, for example. Also, in case a compact disc is given as a specific product to the robot 1, the corresponding predetermined action of the robot 1 should be dancing to a melody stored in the compact disc, for example.

Note that the action-generation information may not always be stored in a memory card in advance. Alternatively, the robot manufacturer may make such an arrangement that the robot 1 can acquire action-generation information from a server which is an information server (information management unit) via a radio or cable information communication network, and act in a predetermined manner, based on the information, when having read a bar code BC or a combination of bar code BC and cyber code CC. This will further be described later.

(2-2) Action of the Robot 1 When Reading a Bar Code Appended to a Product Under the Contract In step S4 in FIG. 7, the user of the robot 1 purchases a specific product having appended thereto a bar code BC or a combination of bar code BC and cyber code CC for recognition by and growth (new action) of the robot 1. The specific product is a canned juice 100a, bagged candy 100b or compact disc 100c, for example, as shown in FIGS. 9A to 9C. The user shows the robot 1 a bar code BC and cyber code CC on the product as shown.

Figure 11A:
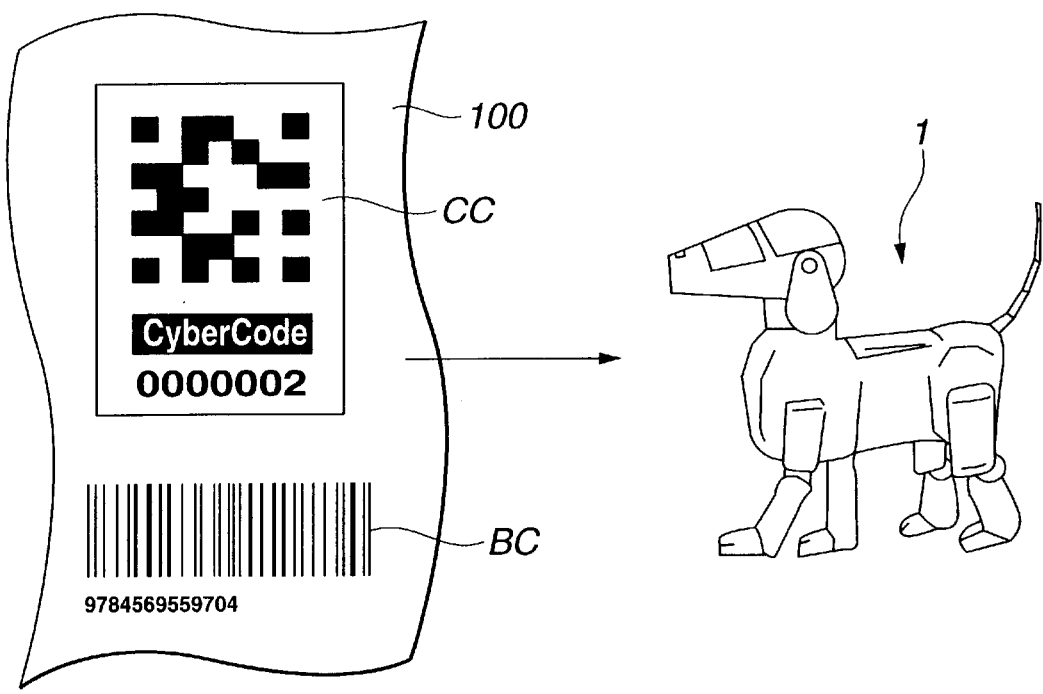
FIG. 11 explains the direct or indirect recognition of a bar code or a bar code/cyber code appended to a product.
Figure 11B:
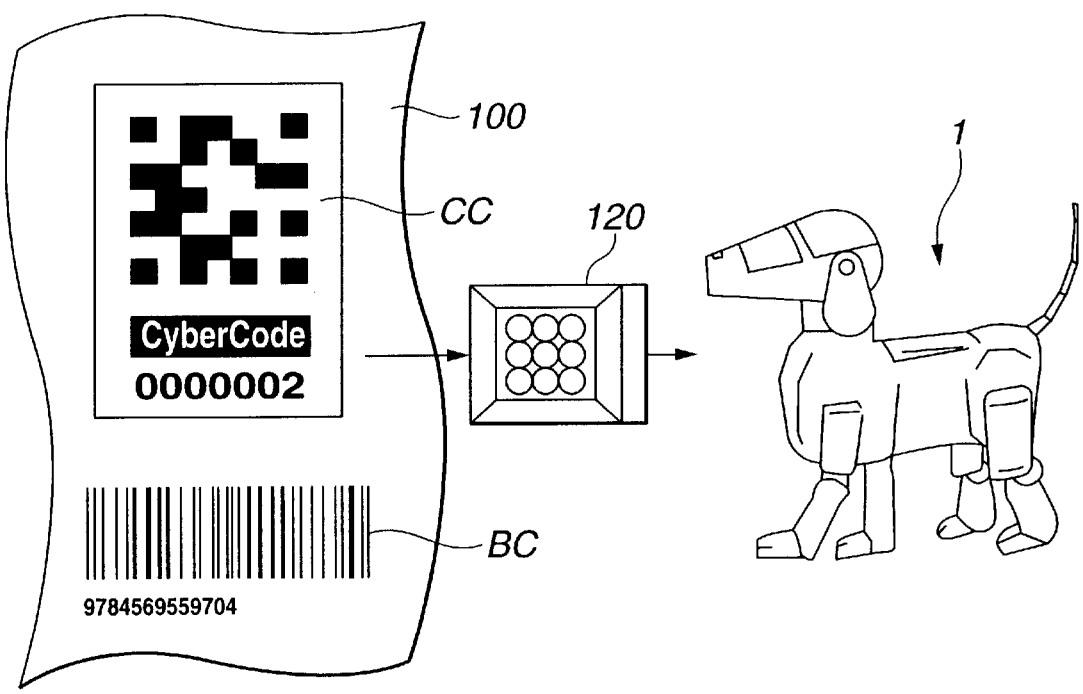

Thus, as shown in FIG. 11A, the robot 1 will recognize directly the bar code BC and cyber code CC by means of the CCD camera 16 shown in FIG. 2. As shown in FIG. 11B, the robot 1 can recognize the bar code BC and cyber code CC by means of a reader 120. In this case, the bar code BC and cyber code CC appended to the product will be read by the reader 120, and the robot 1 will recognize indirectly the bar code BC and cyber code CC on the basis of scale information or infrared rays sent from the reader 120.

The robot 1 will recognize the bar code BC or the combination of bar code BC and cyber code CC as follows. Namely, for this recognition, the robot 1 holds, in a memory or the like provided therein, information (for example, information on a bar code image) on a contract made between the robot manufacturer and product manufacturers in a third party, and compares the contract-related information with a bar code BC or a combination of bar code BC and cyber code CC detected by the CCD camera 16.

The robot 1 having recognized the bar code BC or the combination of bar code BC and cyber code CC as covered by the contract, will act according to action-generation information prepared based on the bar code BC or the combination of bar code BC and cyber code CC in step S5 in FIG. 7.

Note that in the robot 1 shown in FIG. 2 and having been described in the foregoing, the memory 10A or information storage (not shown) functions as an attribute storage unit to store a bar code BC or a combination of bar code BC and cyber code. CC related to the attribute of a product, the CCD camera 16 in FIG. 2 serves as a product-information reader to read at least a bar code BC or cyber code CC appended to a product, and a part of the controller 10 functions to make a comparison between the information stored in the memory 10A or the like and the bar code BC or the like read by the CCD camera 16. When there is found a coincidence between the information and bar code BC or the like as the result of comparison from the part of the controller 10, the robot 1 will act in a predetermined manner. That is to say, the robot 1 is adapted to provide a predetermined action when pre-stored information such as a bar code or the like coincides with a bar code read by the CCD camera 16.

For instance, when the specific product is milk, the robot 1 having recognized the bar code BC or combination of bar code BC and cyber code CC will output a "licking" sound. In case the specific product is a compact disc, the robot 1 having read the bar code BC or combination of bar code BC and cyber code CC will output a melody stored in the compact disc and dance to the melody.

Note that the robot 1 may be adapted to provide an action having an raised level of growth when having recognized a bar code BC or combination of bar code BC and cyber code CC. Although the aforementioned robot 1 is set so as to act correspondingly to each of growth steps in a growth model, it may be adapted to act with the growth step thereof shifted from "boyhood" to "adolescence" by recognizing a bar code BC or a combination of bar code BC and cyber code CC. Thereby, the recognition by the robot 1 of the bar code BC or combination of bar code BC and cyber code CC can be liked to the growth of the robot 1 itself.

Also, the action of the robot 1 may be further complicated ones such as "trick", "performance", etc., not any simple one.

Next, there will be described differences between when only a bar code BC is appended to a product and when a bar code BC and a cyber code CC are appended in combination to the product.

In case a contract made between the product manufacturer and robot manufacturer covers only a predetermined bar code BC for a specific product, the user can only see his or her robot 1 act in a single manner in the presence of the same product.

On the other hand, in case a contract made between the product manufacturer and robot manufacturer covers a combination of a bar code BC and a cyber code CC for a specific product, the user will be able to see his robot 1 act in different manners even with the same product if the cyber code CC appended to the product is different from the bar code BC also on the product. Thus, with the combination of bar code BC and cyber code CC used on the product, the user can see his robot 1 act in different manners, which will add to the fun of playing with the robot 1.

Note that if the robot 1 cannot recognize a bar code BC and cyber code CC in combination simultaneously by means of the CCD camera 16, the bar code BC and cyber code CC should be shown separately to the robot 1 (CCD camera 16). In this case, the bar code BC and cyber code CC may be shown to the robot 1 in this order, or the cyber code CC may be shown to the robot 1 before the bar code BC is shown. In any case, the robot 1 can recognize the separately entered bar code BC and cyber code CC as a set of information and provide a predetermined action based on action-generation information stored in the bar and cyber codes.

The robot 1 may be adapted to store a number of times it has seen a bar code BC or combination of bar code BC and cyber code CC, and not to provide any predetermined action when it has seen a bar code BC or combination of bar code BC and cyber code CC a predetermined number of times. Thereby, the robot 1 will not provide any action when having recognized the same bar code BC or the same combination of bar code BC and cyber code CC a predetermined number of times. Thus, to see the robot 1 acting, the user has to purchase a product having appended thereto another bar code BC or another combination of bar code BC and cyber code CC.

As in the above, the cyber code CC is formed from a pattern $CC_1$ and a number $CC_2$. However, a plurality of combinations of a pattern $CC_1$ and a number $CC_2$ will allow the robot 1 to have a limitless extensibility of the action.

Also, actions the robot 1 can provide based on a bar code BC or a combination of bar code BC and cyber code CC appended to a product should preferably be kept unknown to the user before the product is actually used with his robot 1, which will effectively add to the fun of playing with the robot 1 because of the product's unexpectedness. Namely, it is not possible to predict actions of the robot 1 in advance unless a bar code BC or a combination of bar code BC and cyber code CC on a purchased product is shown to the robot 1, and the actions of the robot 1 can be enjoyed only after the product or the bar code BC or combination of bar code BC and cyber code is shown to the robot 1. Keeping unknown to the user of the robot actions the product will assure will add to the fun in playing with the robot 1.

The robot manufacturer may change or update action-generation information corresponding to a bar code BC or a combination of bar code BC and cyber code CC. For example, the action-generation information may be updated periodically, whereby the robot 1 will act in different manners even in case it is let to recognize the same bar code BC or combination of bar code BC and cyber code CC.

Further, such action-generation information thus updated should be stored into a memory card for distribution to the users. Unless the user purchases the memory card, he is inhibited thereby from enjoying different actions which could be made by the robot 1 with the same bar code BC or combination of bar code BC and cyber code CC.

Also, in step S4 in FIG. 7, the user accesses a Web site of a product manufacturer where a bar code BC or a combination of bar code BC and cyber code CC is displayed, to display a Web page on the monitor for recognition by and growth of the robot 1.

Then, the user will let his robot 1 see the bar code BC and cyber code CC included in the Web page displayed on the screen 111a of the monitor 111 as shown in FIG. 10.

In step S5 in FIG. 7, the robot 1 having recognized the bar code BC or combination of bar code BC and cyber code CC by means of the CCD camera 16, will act according to action-generation information prepared based on the bar code BC or combination of bar code BC and cyber code CC.

As having been described in the above, the robot 1 can provide various effects.

Figure 12:
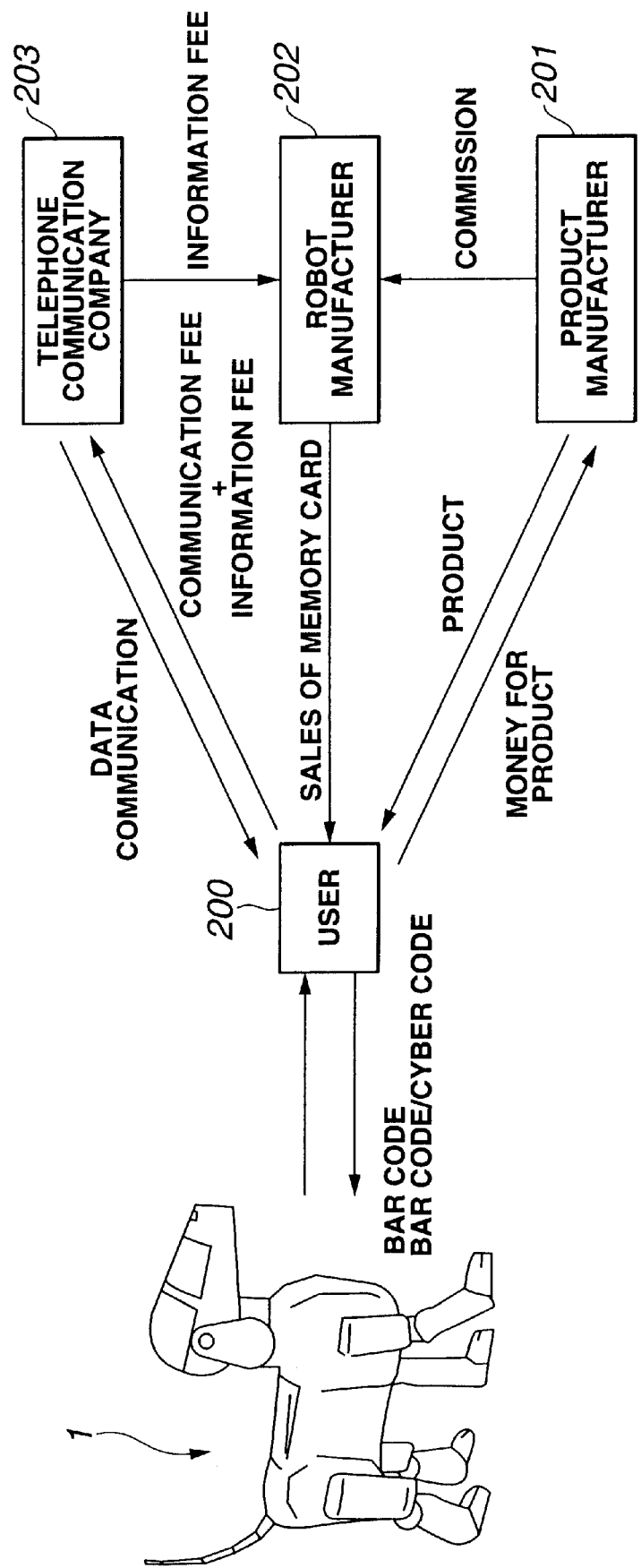
FIG. 12 is a block diagram of procedures made among the robot manufacturer, product manufacturer, telephone communication company and user.

Also, in step S4 in FIG. 7 and as shown in FIG. 12, a profit (payment) M2 takes place at the product manufacturer 201 for the sales of a product to a user 200.

Also, in step S2 in FIG. 7 and as shown in FIG. 12, the robot manufacturer 202 can receive, from the product manufacturer 201, a contract fee due to the contract made between the product manufacturer 201 and robot manufacturer 202, and a commission M1 due to the purchase by the user 200 of the product for recognition by and growth of his robot 1.

More particularly, the commission is a part of the money for the sold product, paid from the product manufacturer 201 to the robot manufacturer 202. Also, a fee calculated based on a number of accesses to the Web site is paid from the product manufacturer 201 to the robot manufacturer 202 for the display of the Web page on the Web site.

Furthermore, in step S5 in FIG. 7 and as shown in FIG. 12, the robot manufacturer 202 will make a profit for a memory card purchased by the user 200 for a predetermined action of his robot 1. For example, the robot manufacturer 202 can make a profit by selling a new memory card having stored therein a new way of playing with the robot 1, new action and function of the robot 1 to the user 200 in a predetermined period of time after the user purchased his robot 1, while the user 200 can enjoy the actions of his robot 1, responsive to a robot product and based on information served from the new memory card.

Note that the present invention has been described in the foregoing concerning the use of a memory card having action-generation information stored therein but it is not limited to the use of any memory card with the robot 1. The robot manufacturer may arrange the robot 1 to acquire action-generation information from an information server via a radio or cable information communication network, and act according to the action-generation information when having read a bar code BC or a combination of bar code BC and cyber code CC. This will further be described below with reference to FIG. 13.

Figure 13:
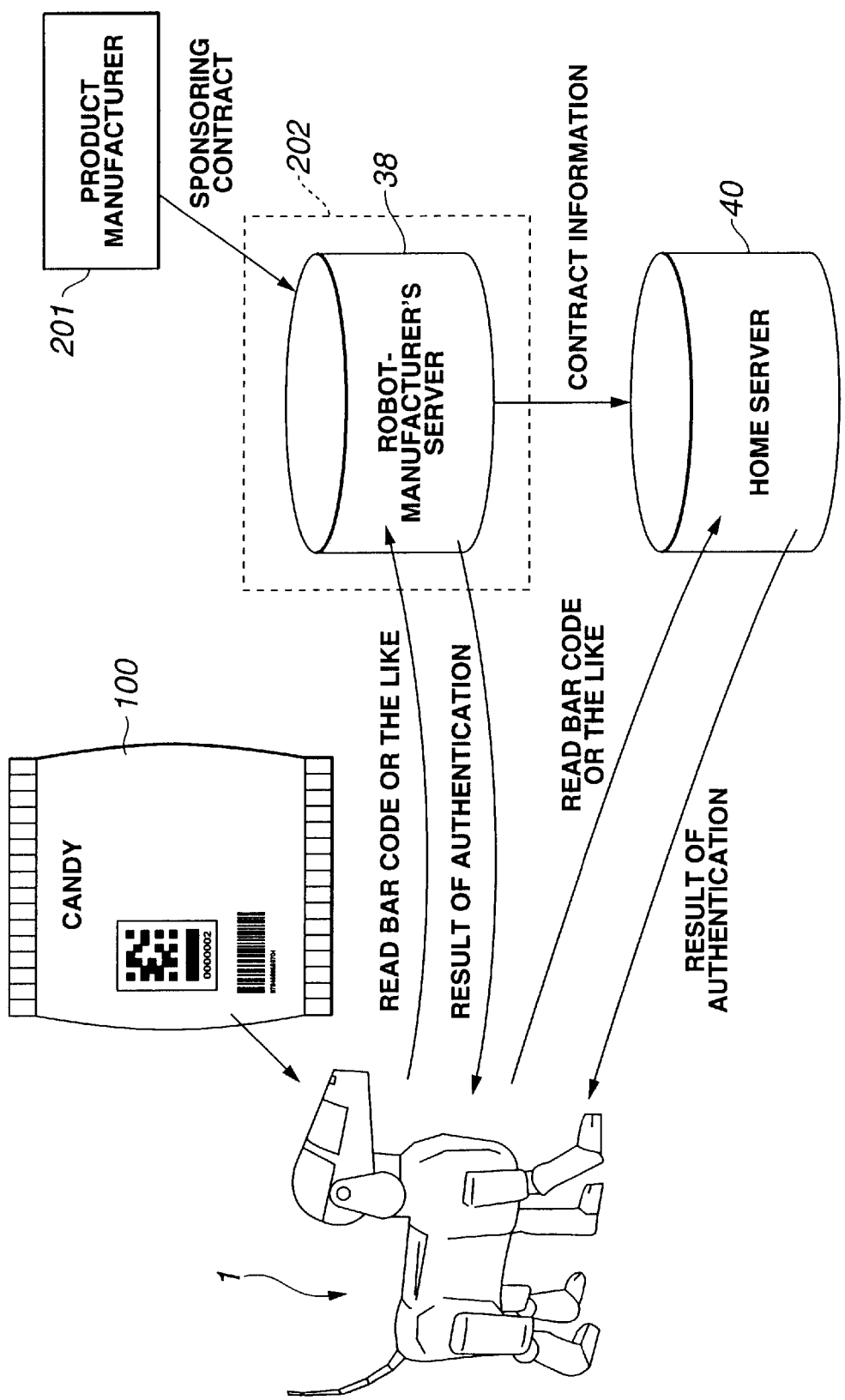
FIG. 13 is a block diagram of operations including sending of a bar code read by the robot to a robot manufacturer's server or hose server, and sending a corresponding result of authentication from the robot manufacturer's server or hose server to the robot.

As seen from FIG. 13, the robot 1 sends a bar code BC or a combination of bar code BC and cyber code CC to a robot manufacturer's server 38 or home server 40.

The robot manufacturer's server 38 is a server owned by the robot manufacturer 202, and has stored therein the coverage of a contract the robot manufacturer 202 has made with the product manufacturer 201. For example, the server 38 has stored therein as a data base a bar code BC or a combination of bar code BC and cyber code CC and action-generation information etc. corresponding to the bar code BC or combination of bar code BC and cyber code CC.

Based on the information stored as a data base, the robot manufacturer's server 38 selects action-generation information corresponding to a bar code BC or combination of bar code BC and cyber code CC sent from the robot 1, and sends the selected information to the robot 1. That is, the robot manufacturer's server 38 receives a bar code BC or combination of bar code BC and cyber code CC sent from the robot 1, and sends action-generation information to the robot 1 when the bar code BC or combination of bar code BC and cyber code CC falls within the coverage of the contract.

Figure 14:
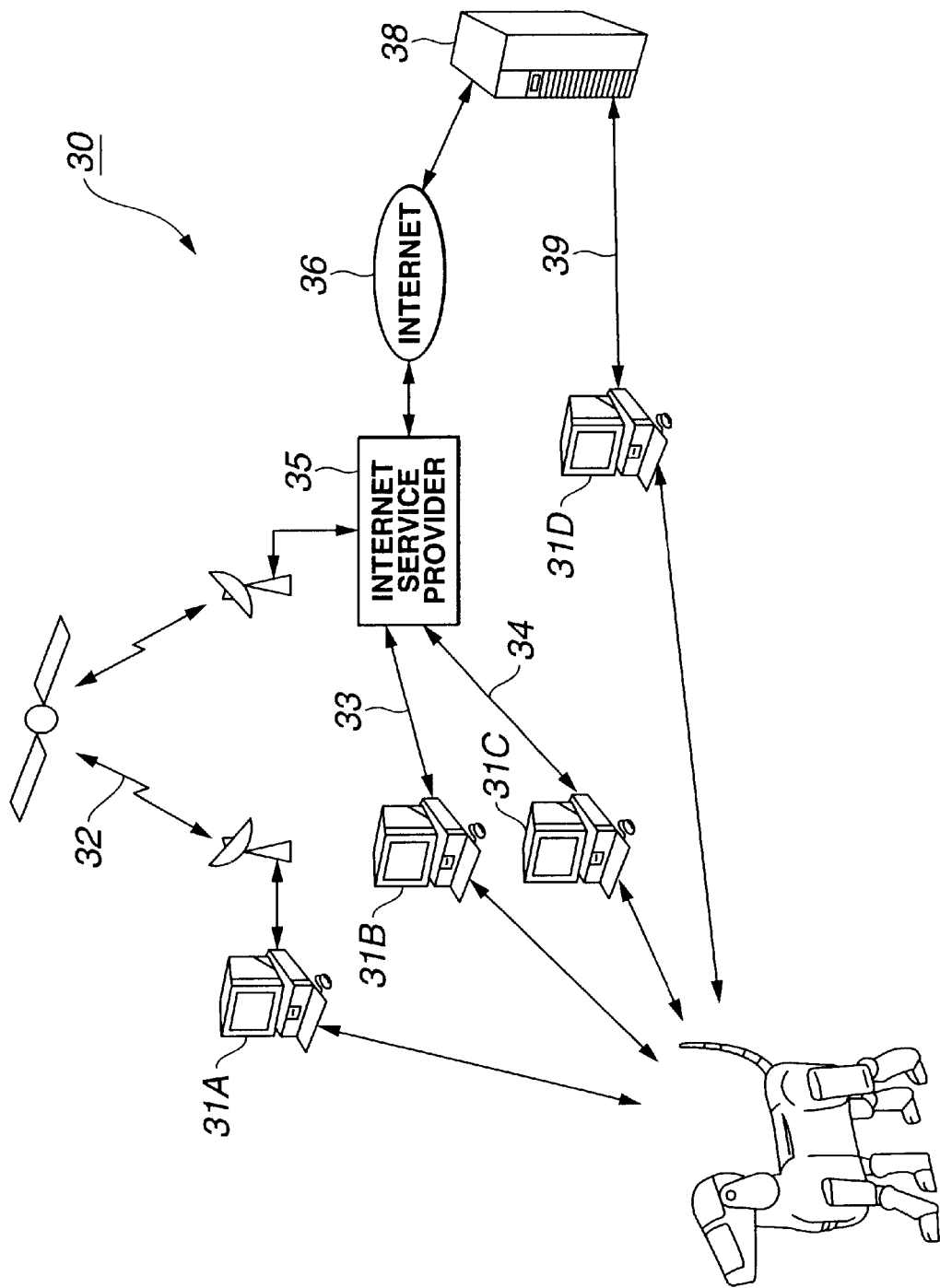
FIG. 14 is a block diagram of an information communication network over which data communication can be made between the robot and robot manufacturer's server.

For example, data communication between the robot manufacturer's server 38 and robot 1 is effected over an information communication network 20 as shown in FIG. 14.

In the information communication network 30, there exist personal terminal devices 31A, 31B, 31C and 31D connected to the server 38 by various telecommunication lines 32, 33, 34 and 39, respectively. The personal terminal devices 31A to 31D are ordinary personal computers installed in ordinary homes, respectively, each of which communicates with the server 38 via an Internet 36 or an ordinary public network (39 ?) to send and receive necessary data to and from the server 38, and communicates with the robot 1.

In the information communication network 30, the robot 1 can make data communication with the server 38 via the personal terminal device 31. More specifically, a bar code BC or a combination of bar code BC and cyber code CC is sent from the robot 1 to the robot manufacturer's server 38 via the personal terminal device 31, ad action-generation information corresponding to the bar code BC or combination of bar code BC and cyber code CC is sent from the robot manufacturer's server 38 to the robot 1 via the personal terminal device 31.

On the other hand, the home server 40 is a home-installed personal one, and has stored therein the coverage of a contract the robot manufacturer 202 has made with the product manufacturer 201. For example, the home server 40 has stored therein as a data base a trade name of a product, a bar code BC or combination of bar code BC and cyber code CC appended to the product, and action-generation information corresponding to the bar code BC or combination of bar code BC and cyber code CC.

For example, since the coverage of the aforementioned contract made between the product manufacturer 201 and robot manufacturer 202 is basically managed by the robot manufacturer's server 38, information stored in the home server 40 is sent from the robot manufacturer's server 38 under a contract made between the robot manufacturer's server 38 and user (home server 40).

Similarly to the robot manufacturer's server 38, the home server 40 sends, to the robot 1 on the basis of information registered as such a data base, action-generation information corresponding to a bar code BC or combination of bar code BC and cyber code CC sent from the robot 1. Namely, the home server 40 receives a bar code BC or combination of bar code BC and cyber code CC sent from the robot 1, and sends, to the robot 1, action-generation information when the bar code BC or combination of bar code BC and cyber code CC falls within the coverage of the contract.

Based on the action-generation information thus sent from the robot manufacturer's sever 38 or home server 40 the robot 1 will act in a predetermined manner in response to a product such as the candy 100 it sees.

In the aforementioned embodiment of the present invention, the robot 1 provides a predetermined action by data communication with a predetermined server. However, the present invention is not limited to this arrangement. By way of example, the robot 1 may be adapted to receive information from a so-called third party in the information communication network and act based on the received information. More specifically, the user acquires, into his robots, a bar code etc. as attribute information available from the third party in the information communication network. Thus, the robot 1 compares the acquired bar code with information such as a bar code stored therein in advance, and acts a predetermined manner when the result of comparison shows a coincidence between the bar codes.

In the foregoing, the embodiment of the present invention has been described in which a bar code BC or combination of bar code BC and cyber code CC is appended to a product or access is made to a Web page to display a bar code BC or combination of bar code BC and cyber code CC on the monitor screen. However, the present invention is not limited to this arrangement but a bar code BC or combination of bar code BC and cyber code CC may be displayed on the display screen of a mobile telephone for example. This will further be described below.

Figure 15:
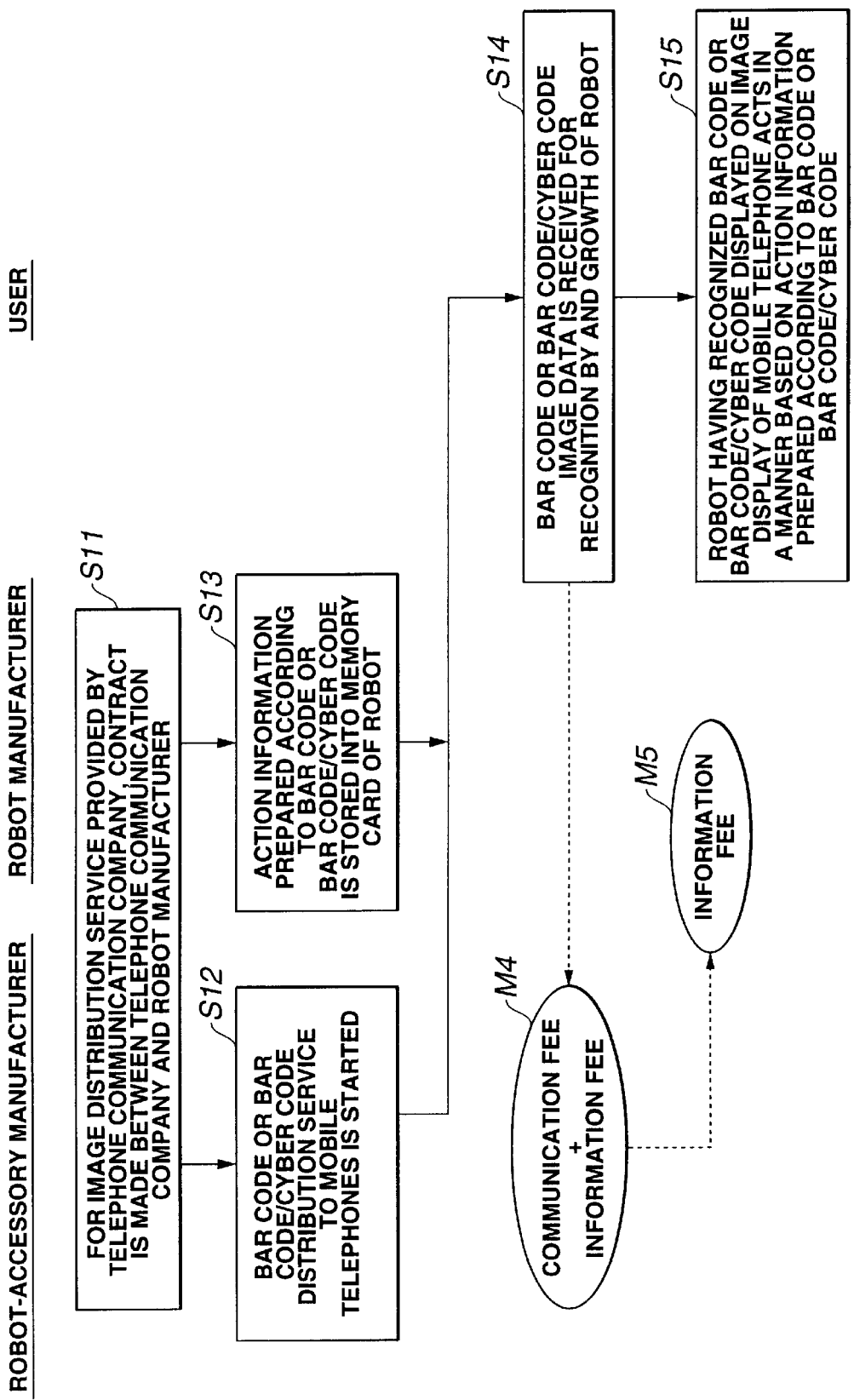
FIG. 15 is a flow chart of transactions made between the telephone communication company, robot manufacturer and user.

As shown in FIG. 15, the robot manufacturer makes a contract with a telephone communication company for an image distribution service provided by the latter. The contract covers that the telephone communication company shall distribute an image of a predetermined bar code BC or combination of bar code BC and cyber code CC while the robot manufacturer 202 shall arrange the robot 1 having read the bar code BC or combination of bar code BC and cyber code CC to act in a predetermined manner. For example, in case the robot manufacturer has made a contract with the product manufacturer for appendage of a bar code BC or a combination of bar code BC and cyber code CC to a specific product as having previously been described, an image of a bar code BC or a combination of bar code BC and cyber code CC is distributed in addition to an image of the specific product, whereby the robot manufacturer will be able to have a contract fee from the robot-access manufacturer.

Under the aforementioned contract, the product manufacturer starts, in step S12, a service of distributing a bar code BC or combination of bar code BC and cyber code CC to the mobile telephone.

On the other hand, for an arrangement under the contract to allow the robot 1 to act in a predetermined manner when having read a bar code BC or combination of bar code BC and cyber code CC, the robot manufacturer stores, into the memory card of the robot 1 in step S13, action-generation information destined to allow the robot 1 to act in a predetermined manner when the bar code BC or combination of bar code BC and cyber code CC is detected as an external factor as in the above, that is, when the bar code BC or combination of bar code BC and cyber code CC is picked up by an imaging means such as the CCD camera 16 of the robot 1 shown in FIG. 2.

In step S14, the user of the robot 1 receives an image data of a bar code BC or combination of bar code BC and cyber code CC for recognition by and growth of the robot 1. In step S14 in FIG. 15 and as shown in FIG. 12, the telephone communication company can have a communication fee plus information fee M4 for the reception by the user of the image data. Also, under the contract, the robot manufacturer will be able to have an information fee M5 from the telephone communication company.

Figure 16:
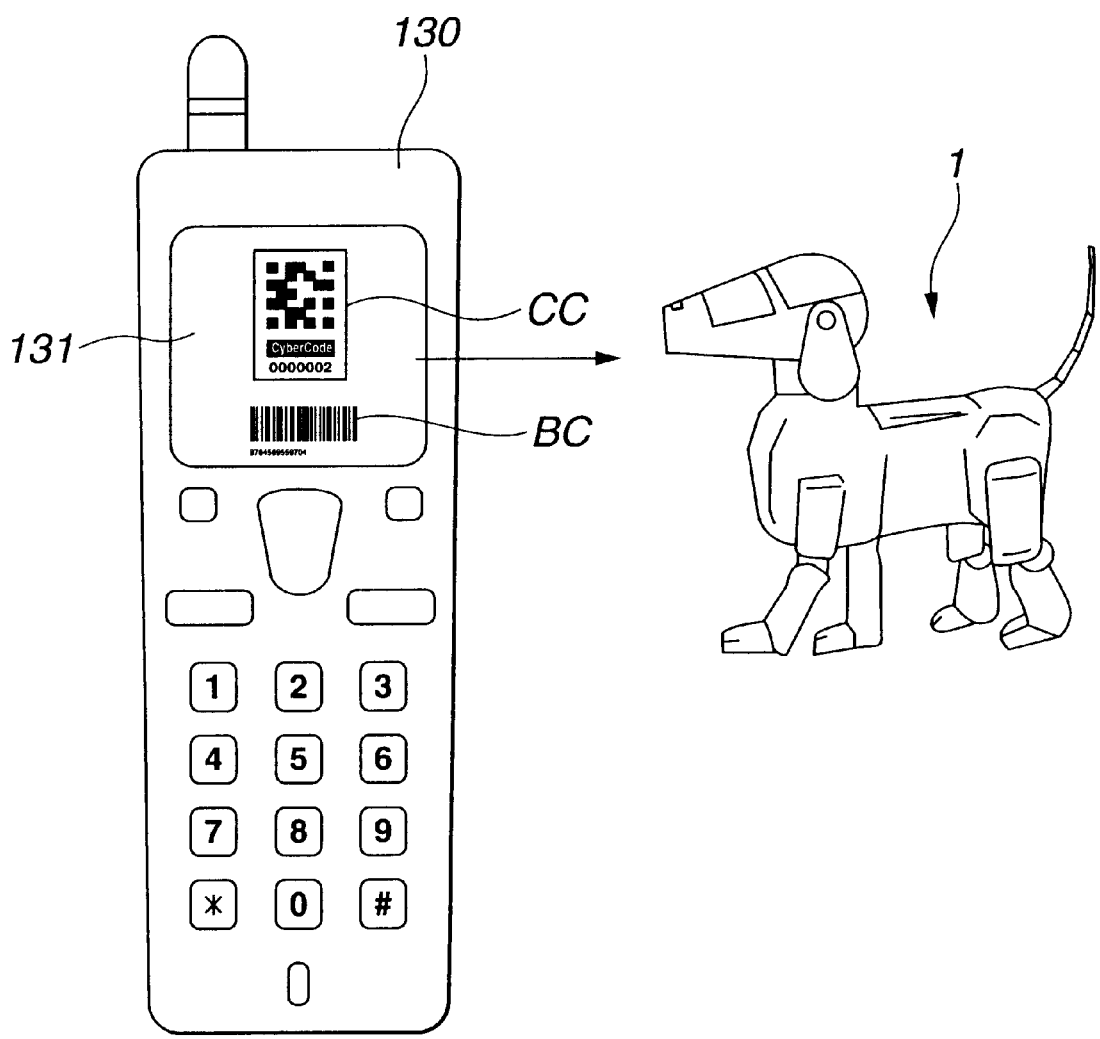
FIG. 16. shows a bar code/cyber code combination displayed on the display screen of a mobile telephone and being viewed by the robot.

As shown in FIG. 16, the robot 1 recognizes directly a bar code BC and cyber code CC displayed on a display screen 131 of a mobile telephone 130 by means of the CCD camera 16 in FIG. 2.

Thus, in step S15 in FIG. 15, the robot 1 having recognized the bar code BC or combination of bar code BC and cyber code CC by means of the CCD camera 16 provides a predetermined action according to action-generation information prepared based on the bar code BC or combination of bar code BC and cyber code CC.

As having been described in the foregoing, under a contract made between the telephone communication company and robot manufacturer for distribution of an image data of a bar code BC or combination of bar code BC and cyber code CC, the user will be able to receive, by means of his mobile telephone, the image of the bar code BC or combination of bar code BC and cyber code CC and show it to the robot 1, thereby allowing the robot 1 to act in a predetermined manner according to action-generation information prepared based on the bar code BC or combination of bar code BC and cyber code CC.

Further, in the foregoing, the embodiment of the present invention has been described in which a bar code BC or a combination of bar code BC and cyber code CC is read by the CCD camera 16 which is an inherent part of the robot 1. That is to say, a combination of bar code BC and cyber code CC (or only a bar code BC) displayed on each of consumable goods (consumable goods group A) including the personal computer 110, mobile telephone 130, etc. and a one appended to each of consumable goods (consumable goods group B) including the canned juice 100a, bagged candy 100b, CD case 100c, is read by the CCD camera 16 being the "eyes" of the robot 1 as shown in FIG. 17A.

However, the present invention is not limited to the above, but a bar code BC or a combination of bar code BC and cyber code CC may be read by an external dedicated reader. The dedicated reader includes a bar code reader 140, imaging device (e.g., external CCD camera) 141, etc. externally connectable to the robot 1 for example as shown in FIG. 17B. As an interface provided in the robot 1 for connection of such an external reader, there is available a so-called PC (personal computer) card slot. Recently, the PC card slot has been provided in more and more robots. For example, the PC card slot, when provided in the robot 1, will permit to use a PC card of a communication modem which enables communications between a personal computer and other robots.

As shown in FIG. 17B, the robot 1 can read a bar code BC and cyber code CC (or only a bar code BC) by means of the bar code reader 140 or imaging device (for example, external CCD camera) 141 connected to the robot 1 with the aid of the PC card slot as an interface which is also usable in any other applications. Thus, the robot 1 can use the dedicated bar code reader 140 or imaging device 141, which can be said to have been technically established as a unit, to read a bar code BC and a cyber code CC with a considerably high accuracy. Also, use of the PC card slot as an interface which is usable in any other applications as well, will eliminate the need to provide any new or additional interface for connection of an external reader and make it possible to attain a high accuracy of recognition.

What is claimed is:

1. An automatic apparatus comprising:
   an attribute storage unit to store information on the attribute of a product;

a product-related information reader to read, from a product, at least one of at least two pieces of information stored on the product and which concern the attribute of the latter;

an information comparator to make a comparison between the information stored in the attribute storage unit and information read from the product-related information reader;

the automatic apparatus being arranged to act in a predetermined manner when there is found a coincidence between the information as the result of comparison made in the information comparator.

2. The device according to claim 1, wherein the predetermined action is based on the information read from the product-related information reader.

3. The device according to claim 1, wherein:

the information on the attribute of the product includes information on at least a supply source of the product and action-generation information corresponding to information on the source-related information, the source having made a predetermined contract with a manufacturer or distributor of the automatic apparatus; and the predetermined action is based on the action-generation information.

4. The device according to claim 1, being an autonomous type robotic apparatus which acts autonomously based on an external factor and/or internal factor.

5. A method for generating an action of an automatic apparatus, the method comprising steps of:

reading, from a product, at least one of two pieces of information stored on the product and which concern the attribute of the latter;

making a comparison between information pre-stored in an attribute storage unit and information read in the product-related information reading step; and allowing the automatic apparatus to act in a predetermined manner when there is found a coincidence between the information as the result of comparison made in the information comparing step.

6. The method according to claim 5, wherein the automatic apparatus is an autonomous type robotic apparatus which acts autonomously based on an external factor and/or internal factor.

7. An information server comprising a sender to send information on the attribute of a product, cumulatively stored in an attribute storage unit included in an automatic apparatus, to a communication unit also included in the automatic apparatus; the automatic apparatus comprising:

the attribute storage unit to store information on the attribute of a product;

a product-related information reader to read, from a product, at least one of at least two pieces of information stored on the product and which concern the attribute of the latter;

an information comparator to make a comparison between information stored in the attribute storage unit and information read from the product-related information reader; and the communication unit to store information into the attribute storage unit.

8. The apparatus according to claim 7, wherein the information on the attribute of the product includes information on at least a supply source of the product and action-generation information corresponding to the source-related information, the source having made a predetermined contract with a manufacturer or distributor of the automatic apparatus.

9. The apparatus according to claim 7, wherein the automatic apparatus is an autonomous type robotic apparatus which acts autonomously based on an external factor and/or internal factor.

10. An information serving method in which information on the attribute of a product is sent to a communication unit included in an automatic apparatus; the automatic apparatus comprising:

an attribute storage unit to store information on the attribute of a product;

a product-related information reader to read, from a product, at least one of at least two pieces of information stored on the product and which concern the attribute of the latter;

an information comparator to make a comparison between information stored in the attribute storage unit and information read from the product-related information reader; and the communication unit to store information into the attribute storage unit.

11. The method according to claim 10, wherein the automatic apparatus is an autonomous type robotic apparatus which acts autonomously based on an external factor and/or internal factor.

12. An information server which reads attribute information sent from a communication unit included in an automatic apparatus and sends, to the communication unit, action-generation information intended to generate a predetermined action of the automatic apparatus when the read attribute information coincides with predetermined information; the automatic apparatus comprising:

a product-related information reader to read, from a product, at least one of two pieces of information stored on the product and which concern the attribute of the latter;

a controller to generate an action; and the communication unit to supply the controller with information intended to generate an action of the automatic apparatus, acquire the attribute information read by the product-related information reader and send the acquired attribute information.

13. The apparatus according to claim 12, wherein the information on the attribute of the product includes information on at least a supply source of the product and action-generation information corresponding to the source-related information, the source having made a predetermined contract with a manufacturer or distributor of the automatic apparatus.

14. The apparatus according to claim 12, wherein the automatic apparatus is an autonomous type robotic apparatus which acts autonomously based on an external factor and/or internal factor.

15. An information serving method comprising steps of:

reading attribute information sent from a communication unit included in an automatic apparatus; and sending, to the communication unit, action-generation information intended to generate a predetermined action of the automatic apparatus when the read attribute information coincides with predetermined information; the automatic apparatus comprising:

a product-related information reader to read, from a product, at least one of two pieces of information stored on the product and which concern the attribute of the latter;

a controller to generate an action; and the communication unit to supply the controller with information intended to generate an action of the automatic apparatus acquire the attribute information read by the product-related information reader and send the acquired attribute information.

16. The method according to claim 15, wherein the automatic apparatus is an autonomous type robotic apparatus which acts autonomously based on an external factor and/or internal factor.

* * * * *